United States Patent
Prabhakar et al.

(10) Patent No.: US 9,677,254 B2
(45) Date of Patent: Jun. 13, 2017

(54) WATER-SAVING FAUCET

(71) Applicant: SensiTap, LLC, Bedford, NH (US)

(72) Inventors: Jay Prabhakar, Bedford, NH (US); Ron Magers, Essex, MA (US); George H. Ciolfi, Hampton, NH (US); Steven J. Gordon, Weston, MA (US)

(73) Assignee: SensiTap, LLC, Bedford, NH (US)

( * ) Notice: Subject to any disclaimer, the term of this patent is extended or adjusted under 35 U.S.C. 154(b) by 0 days.

(21) Appl. No.: 15/294,107

(22) Filed: Oct. 14, 2016

(65) Prior Publication Data

US 2017/0030056 A1 Feb. 2, 2017

Related U.S. Application Data

(63) Continuation-in-part of application No. PCT/US2015/025845, filed on Apr. 15, 2015.

(51) Int. Cl.
| | |
|---|---|
| *F16K 11/078* | (2006.01) |
| *E03C 1/04* | (2006.01) |
| *F16K 31/60* | (2006.01) |
| *F16K 31/524* | (2006.01) |
| *F16K 21/04* | (2006.01) |

(52) U.S. Cl.
CPC .............. *E03C 1/0412* (2013.01); *E03C 1/04* (2013.01); *F16K 11/0787* (2013.01); *F16K 21/04* (2013.01); *F16K 31/524* (2013.01); *F16K 31/60* (2013.01); *F16K 31/605* (2013.01)

(58) Field of Classification Search
CPC ... F16K 11/078; F16K 11/0782; E03C 1/0412

USPC ... 137/625.17, 625.4, 625.41, 630.19, 630.2, 137/636.2, 636.3, 636.4, 801
See application file for complete search history.

(56) References Cited

U.S. PATENT DOCUMENTS

| | | | |
|---|---|---|---|
| 2,991,795 A * | 7/1961 | Fraser | F16K 21/10 |
| | | | 137/244 |
| 3,329,345 A * | 7/1967 | Scott | F16K 31/44 |
| | | | 239/24 |
| 4,226,260 A | 10/1980 | Schmitt | |
| (Continued) | | | |

FOREIGN PATENT DOCUMENTS

| | | |
|---|---|---|
| CN | 202884151 U | 4/2013 |
| FR | 2830601 A1 | 10/2001 |
| (Continued) | | |

*Primary Examiner* — Reinaldo Sanchez-Medina

(74) *Attorney, Agent, or Firm* — Robert R. Deleault, Esq.; Mesmer & Deleault, PLLC

(57) ABSTRACT

A valve assembly for a single-lever faucet is configured to control a flow rate of water and has a valve body, a valve cartridge, and a valve stem. A flow control assembly is operatively connected to the valve assembly and constructed to attach to a faucet handle. The flow control assembly includes a valve stem, a handle actuator that operates the valve stem to control the flow rate of the water, a gear assembly, and a biasing member. Moving the handle actuator to the water-on position from the neutral position increments the valve stem to an open valve position. The handle actuator automatically returns to a neutral position with the water flowing after the user pivots the handle actuator to a water-on position, and automatically returns to the neutral position with no water flowing after the user pivots the handle actuator to the water-off position.

17 Claims, 18 Drawing Sheets

(56) References Cited

U.S. PATENT DOCUMENTS

| | | | |
|---|---|---|---|
| 4,357,957 A | * | 11/1982 | Bisonaya .............. F16K 11/022 |
| | | | 137/454.6 |
| 4,535,814 A | * | 8/1985 | Pawelzik ............ F16K 11/0782 |
| | | | 137/625.17 |
| 4,819,909 A | | 4/1989 | Hart et al. |
| 4,960,154 A | | 10/1990 | Dagiantis |
| 5,082,023 A | | 1/1992 | D'Alayer de Costemore d'Arc |
| 5,342,018 A | | 8/1994 | Wu |
| 5,363,880 A | | 11/1994 | Hsieh |
| 5,494,077 A | | 2/1996 | Enoki et al. |
| 5,522,429 A | | 6/1996 | Bechte et al. |
| 5,967,184 A | | 10/1999 | Chang |
| 6,170,523 B1 | | 1/2001 | Chang |
| 6,390,128 B1 | | 5/2002 | Tung |
| 6,736,369 B2 | | 5/2004 | Lenart et al. |
| 6,796,544 B1 | | 9/2004 | Chen |
| 6,920,899 B2 | | 7/2005 | Haenlein et al. |
| 7,093,615 B2 | | 8/2006 | Shane |
| 7,219,696 B2 | | 5/2007 | Cattaneo |
| 7,287,707 B2 | | 10/2007 | Kempf et al. |
| 7,556,061 B2 | | 7/2009 | Morita et al. |
| 8,109,292 B2 | | 2/2012 | Bolgar et al. |
| 8,347,905 B1 | | 1/2013 | Stirtz |
| 9,103,102 B1 | * | 8/2015 | Prabhakar ............. E03C 1/0412 |
| 9,328,489 B2 | * | 5/2016 | Prabhakar ............. E03C 1/0412 |
| 2004/0187261 A1 | | 9/2004 | Haenlein |
| 2009/0094740 A1 | | 4/2009 | Ji |
| 2010/0117017 A1 | | 5/2010 | Freyre |

FOREIGN PATENT DOCUMENTS

| | | |
|---|---|---|
| GB | 2193557 A | 10/1998 |
| JP | 2002-276850 A | 9/2002 |
| JP | 2011-256605 A | 12/2011 |
| WO | 2013072909 A1 | 5/2013 |

\* cited by examiner

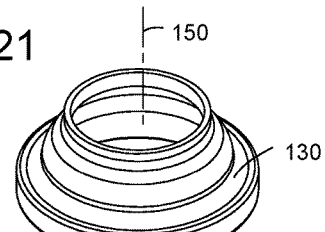
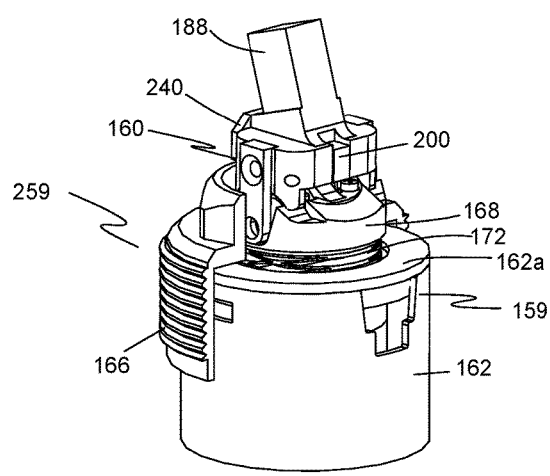
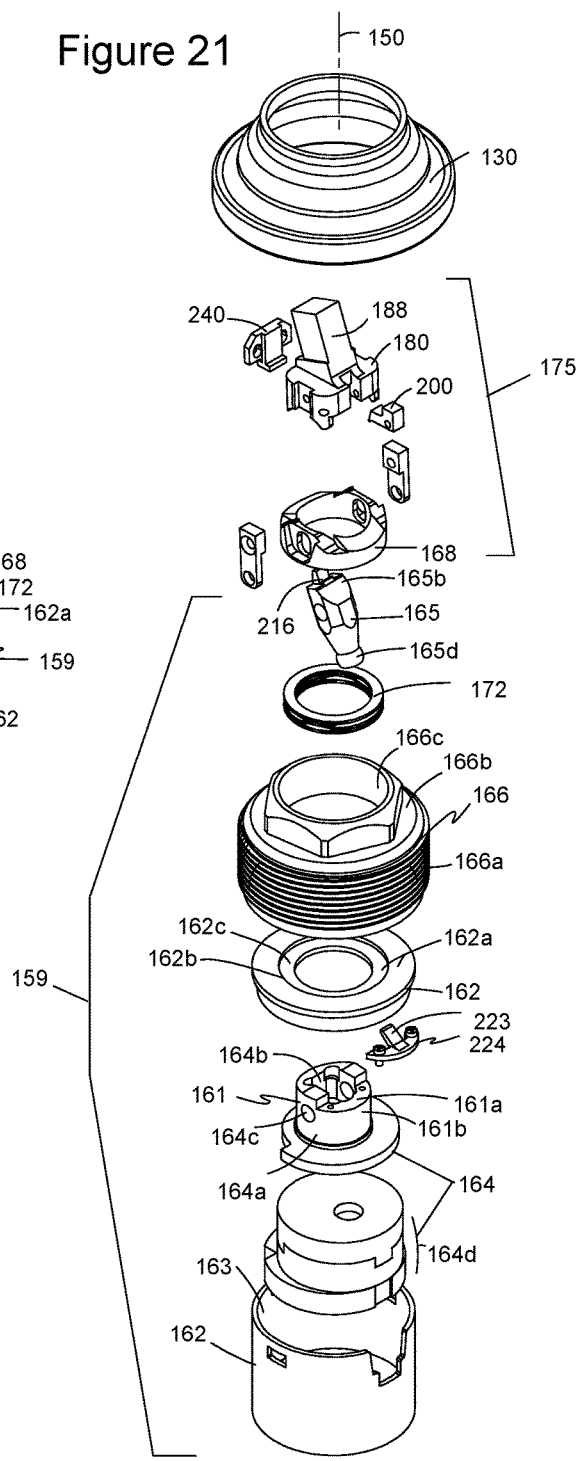

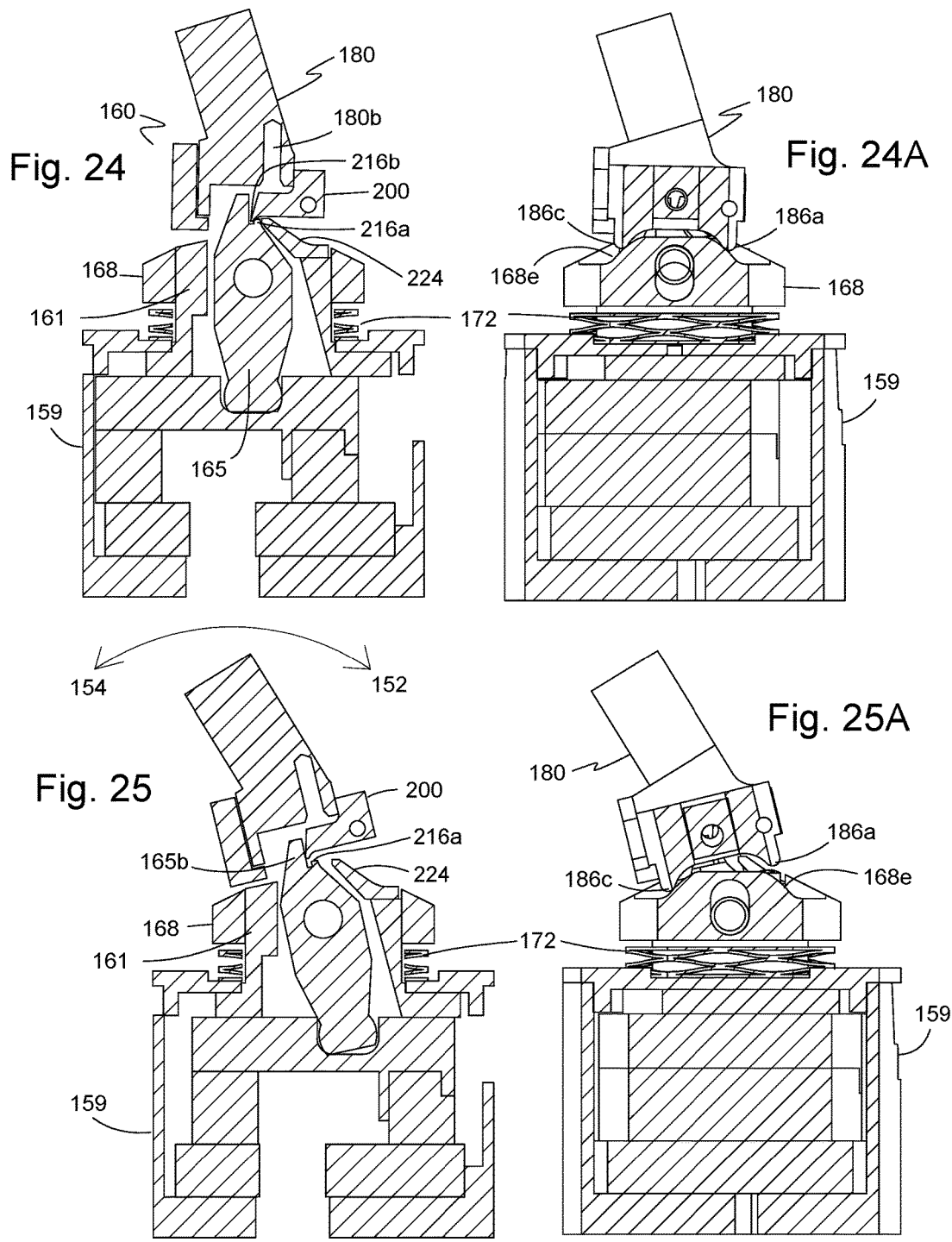

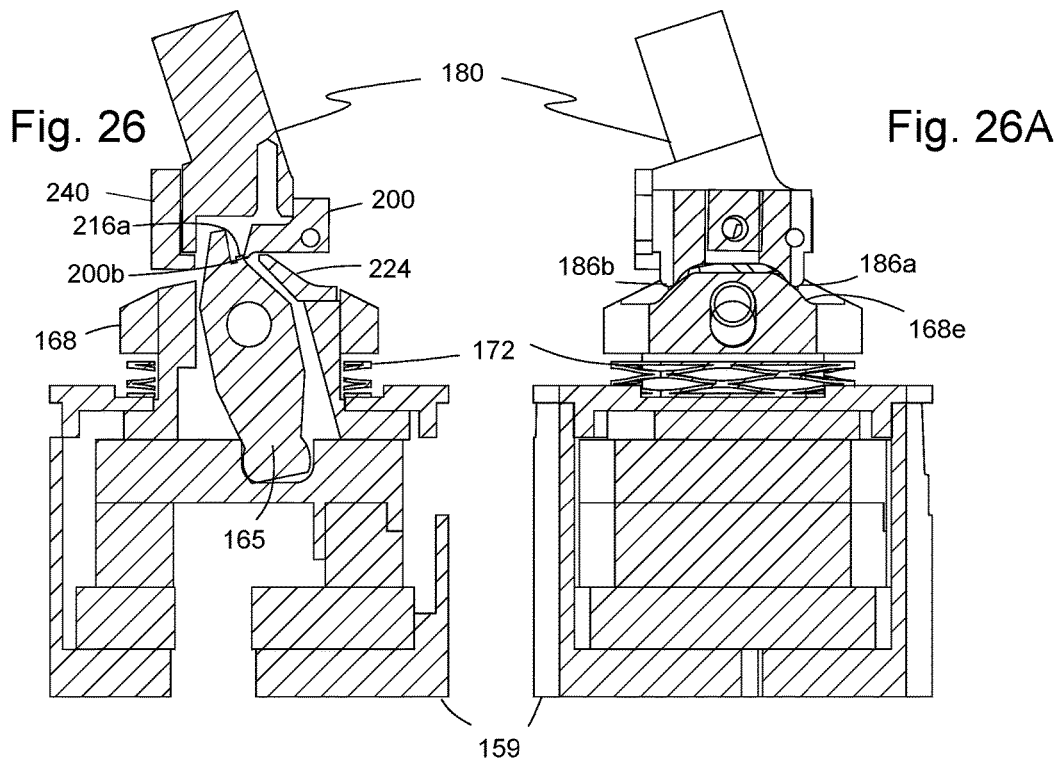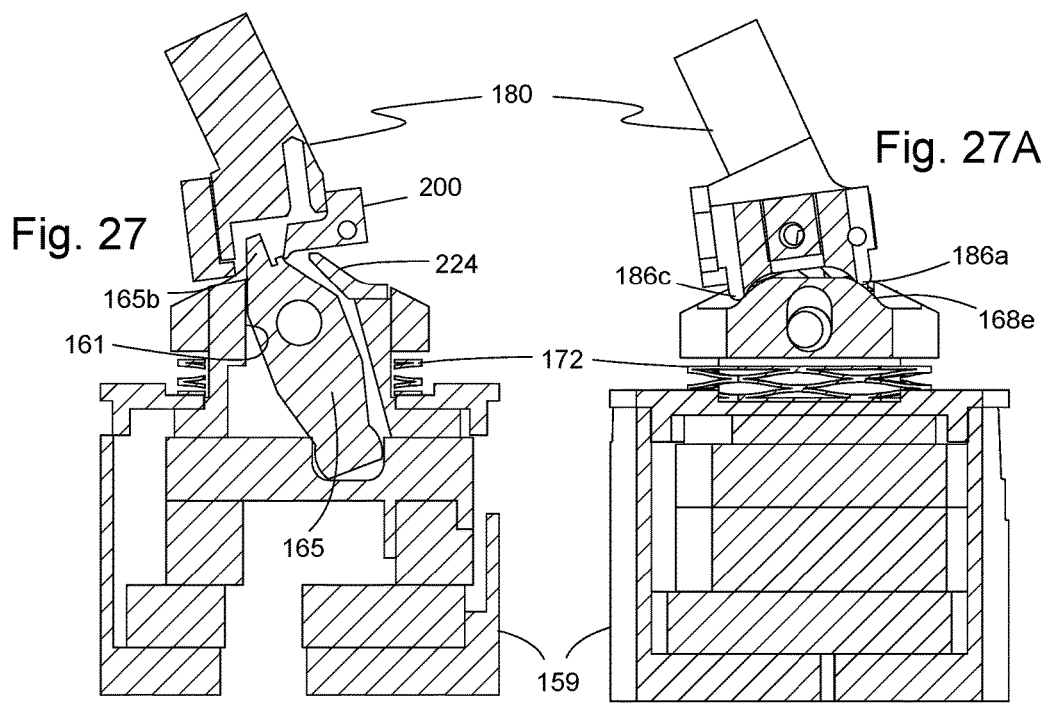

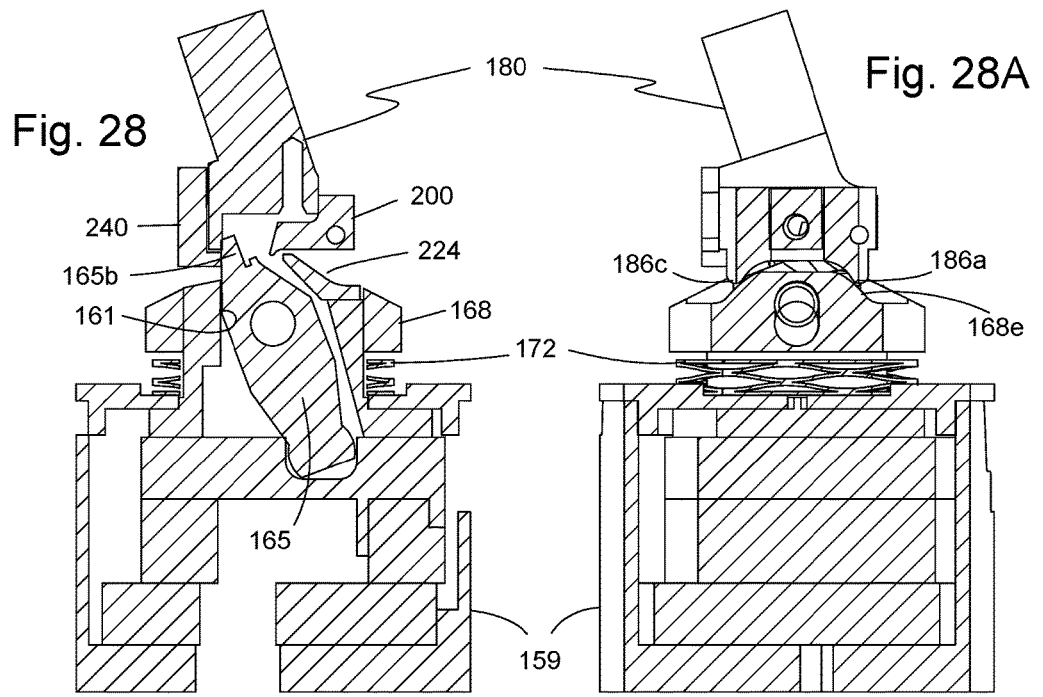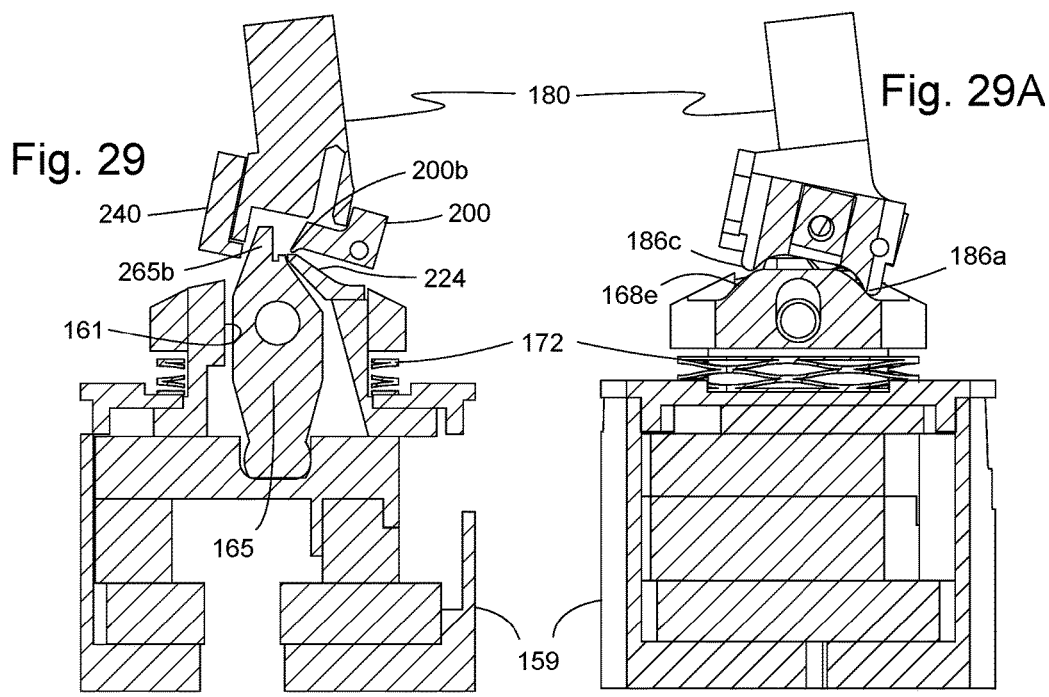

WATER-SAVING FAUCET

BACKGROUND OF THE INVENTION

1. Field of the Invention

The present invention relates generally to plumbing fixtures and more particularly to a water-saving faucet and flow control assemblies therefor.

2. Description of the Prior Art

In a world where the human population is going to exceed 10 billion in the next decade or so, water and its availability will be the natural resource problem over which disputes will arise. The U.S. has a relative abundance of clean water provided through a reliable supply system. This very abundance, however, has also led to a lack of urgency in recognizing this coming natural resource problem. Water shortages are inevitable and will occur in a matter of time. Particularly, water shortages have already become and will continue as a problem in the dry southwest of the United States.

Several of the faucet types sold in the U.S. and overseas have a handle that operates a mixing valve, where one lifts or lowers the handle to increase or decrease the volume of flow and rotates it right or left to change the temperature of the water. The typical distance handle throw is about one or two inches up and down between fully-open and fully-closed positions. It is very difficult for humans to accurately adjust the water flowrate without paying particular attention to the task of turning on the water. However, this is a task people most often perform without much thought. Hence, most users almost always turn on the water to full flow, even when only a small trickle of it is needed. This practice is a huge waste of this precious resource.

SUMMARY OF THE INVENTION

For purposes of this disclosure, the following definitions will apply.

A "single lever faucet" means a faucet where a single lever controls both the cold and hot water flow from the faucet.

A "cam mechanism" means any one of the following structures: a ratchet assembly, a Geneva mechanism, a lead screw, a ball screw, a freewheel mechanism, a one-way friction clutch, a geared arrangement, a plate cam, a cylindrical cam, a face cam, or a linear cam A "cam driving mechanism" that is electrical means an electric/electronic actuator such as a motor, solenoid, piezo, etc. acting on any of the previously listed structures of the cam mechanism.

Accurately controlling the water flow from single-lever faucets is difficult. The primary reason it is difficult to control the flow accurately is a lack of feedback during operation of the faucet. In all things in nature, feedback is essential for efficient functioning. A person's hands know just how much pressure to exert on an egg when picking it up so that it isn't crushed. This is because the fingertips feed various sensory signals (pressure/force, temperature, wetness, etc.) back to the brain, which then interprets these signals relative to the task being performed and adjusts the pressure being applied to the egg accordingly. A person is not even consciously aware of making these adjustments—the reaction is instinctive and transparent to the person. Most such feedback is. All devices that are easy and intuitive to use have feedback which one uses subconsciously.

The lack of continuous feedback in the operation of faucets (known as running 'open loop') makes the human brain perform the task with only one point of feedback: when the faucet is either fully-on or fully-off. That is, the feedback occurs at the limit of one end of the handle's operating range. Thus, when a faucet is turned on, the user exerts a force on the handle until it reaches the upper limit of its travel. Conversely, when a faucet is turned off, the user pushes the handle down until the opposite stop is reached and the water is shut off completely. This, too, is feedback, but it lacks sufficient resolution for a person to use efficiently in controlling the flow of water between the two extremes of fully-off and fully-on.

What is needed is a means of intuitively controlling water flow. The ideal way to do this would be to introduce 'force feedback' to the operation of the handle. When one initially exerts force on the handle to open it, there should be very little resistance to moving the handle. As the water starts to flow, the handle should require the user to exert an ever-increasing force on the handle mechanism, causing the force required to operate the handle to increase until the upper limit of travel is reached. This force will tell the human brain (subconsciously) that more water is flowing and that the user can stop pushing on the handle. Thus, feedback can be achieved, making the act of saving water subconscious.

The present invention will inherently cause users to think about how much water is being used and help them use only as much as is needed, without causing too much inconvenience.

The concept of the present invention is applicable to what are commonly known as 'mixing valves'. This type of faucet has a single handle that is raised and lowered to get water to flow at differing volumes (from no flow to maximum flow) and swiveled from side to side to change the ratio of hot water to cold water, thus changing the temperature of the water output.

Typical usage of these faucets involves raising the handle of the faucet to get water to flow and lowering it to shut it off. Since there is no feedback to the user from the handle and the "throw" is so small, most users raise the handle as far as it will go, until it hits the end of travel. This results in maximum flow for as long as the faucet is open, even though the volume of water required might be less than the maximum delivered by the faucet.

Accordingly, it is an object of the present invention to change the behavior of water faucet users in a manner that results in a reduction in water usage.

It is another object of the present invention to provide a water faucet with a water flow feedback feature that either consciously or subconsciously (i.e. intuitively) imparts on the user the act of saving water.

The present invention achieves these and other objectives by providing a single-throw faucet that includes a faucet body, a faucet spigot, a single lever handle, a valve assembly and a water flow control assembly that is operatively connected between the handle and a valve stem of the valve assembly.

In one embodiment, the water flow control assembly includes a faucet valve coupler and a cam mechanism. The faucet valve coupler has an actuator element and a handle actuator where the actuator element supports the handle actuator. The faucet valve coupler provides a biasing resistance that increases resistance to handle movement as the handle is oriented in a position other than a neutral handle position. In one embodiment, the handle actuator has a biasing portion or is made of a material that provides the biasing resistance. The cam mechanism has a valve stem portion and a handle portion. The cam mechanism is operatively connected to the valve stem of the valve assembly of a single lever faucet to engage the valve stem and move the valve stem to a predefined open position in response to a predefined opening pressure applied to the handle when the handle is moved from a neutral handle position to a water on position.

In another embodiment, the faucet valve coupler includes a handle biasing member is connected between the actuator element and the handle of the single lever faucet to provide increased resistance to the handle when the handle is oriented in a position other than the neutral handle position.

In another embodiment, the cam mechanism is one of a ratchet assembly, a plate cam, a cylindrical cam, a face cam, and a linear cam. The cam mechanism includes a cam driving mechanism that mechanical, electro-mechanical or electrical.

In the embodiment where the cam mechanism is a ratchet assembly, the ratchet assembly includes an actuator gear, a pawl, a pawl biasing member, and a pawl release cam. The actuator gear has a plurality of slots and where the actuator gear is directly connected to the valve stem of the valve assembly of a single lever faucet. The pawl has gear-engaging portion that may selectively engage with one of the plurality of slots on the actuator gear. The pawl biasing member is connected to the pawl and oriented to bias the gear-engaging portion of the pawl into one of the plurality of slots when the handle of the single lever faucet is moved to a water on position. The pawl release cam has a pawl release surface that is engaged by the gear-engaging portion of the pawl to orient the pawl into a slot release position when the handle of the single lever faucet is moved to a water off position.

In another embodiment of the present invention, the water flow control assembly includes a valve closing element that engages the valve stem to orient the valve stem to a water off position when the handle of the single lever faucet is moved to the water off position. The valve closing element may be an angled handle surface on an inside portion of the handle that engages the handle actuator, which has a valve closing surface that contacts the valve stem. The valve closing element may be a handle actuator ring directly connected to the handle actuator where the handle actuator ring has a valve closing surface that contacts the valve stem.

Another aspect of the present invention is directed to a faucet valve assembly for a single-lever faucet. In one embodiment, the faucet valve assembly includes a valve cartridge constructed to be disposed in a faucet body, where the valve cartridge is configured to control a flow rate of water and has a valve body, a regulator with a valve stem stop extending axially through a valve body upper surface, and a valve stem having a lower end portion operatively engaging the regulator and having an actuator gear on an upper end portion of the valve stem, where the valve stem is operable between a closed valve position and a plurality of open valve positions. A flow control assembly is operatively connected to the valve cartridge, is constructed to be disposed in the faucet body, and constructed to attach to a faucet handle. A handle actuator is pivotably connected to the valve cartridge and is operable between a water-on position, a neutral position, and a water-off position, where the handle actuator operates the valve stem to control the flow rate of the water. A pawl is pivotably connected to the handle actuator and positioned to engage the actuator gear on the valve stem when the handle actuator is pivoted to a water-on position. A pawl release member is positioned to engage the pawl and disengage the pawl from the actuator gear when the handle actuator is pivoted to the water-off position. A biasing member engages the handle actuator and provides a resilient force to bias the handle actuator towards the neutral position when the handle actuator is pivoted to the water-on position or to the water-off position. The handle actuator automatically returns to the neutral position with the water flowing after the user pivots the handle actuator to the water-on position followed by the user releasing the handle actuator. The handle actuator automatically returns to the neutral position with no water flowing after the user pivots the handle actuator to the water-off position followed by the user releasing the handle actuator.

In one embodiment, the biasing member is disposed between the valve cartridge and the handle actuator. In one embodiment, the biasing member is a wave spring.

In another embodiment, pivoting the handle actuator a first time to the water-on position moves the valve stem to a first open valve position with a first water flow rate and subsequently pivoting the handle actuator a second time to the water-on position moves the valve stem to the second open valve position with a second flow rate greater than the first flow rate.

In one embodiment, when the valve stem is in the closed valve position, pivoting the handle actuator to the water-on position causes the pawl to engage the actuator gear and move the valve stem to the first open valve position. In one embodiment, when the valve stem is in the first open valve position, pivoting the handle actuator from the neutral position to the water-on position causes the pawl to engage the actuator gear and move the valve stem to the second open valve position.

In another embodiment, pivoting the handle actuator to the water-off position when the valve stem is in any of the plurality of open valve positions moves the valve stem to the closed valve position.

In another embodiment, the actuator gear is on the upper end portion of the valve stem and has a plurality of gear teeth with a gear slot between adjacent ones of the plurality of gear teeth.

In another embodiment, the faucet valve assembly also includes an actuator ring defining an actuator ring opening, where the actuator ring is disposed on the valve stem stop with the upper portion of the valve stem stop extending into the actuator ring opening, with the handle actuator pivotably connected to the actuator ring, and with the biasing member positioned between the actuator ring and the valve body upper surface.

In another embodiment, the biasing member is a wave spring or helical wave spring. Pivoting the actuator member to the water-on position or to the water-off position causes the actuator ring to compress the wave spring, thereby biasing the handle actuator to return to the neutral position.

In another embodiment, the single-lever faucet valve assembly also includes a valve-closing member on the handle actuator, where the valve-closing member engages the valve stem and moves the valve stem to the closed valve position when the handle actuator is moved to the water-off position.

Another aspect of the invention is directed to a water flow control assembly for a single lever faucet. In one embodiment, the water flow control assembly includes a faucet-valve coupler constructed to operatively connect a handle of a single lever faucet to a valve stem of a valve assembly of the single lever faucet and to engage the valve assembly of the single lever faucet. The faucet-valve coupler has a handle actuator pivotably connected to an actuator ring defining an actuator ring opening, where the actuator ring is disposed on the valve assembly with the valve stem extending through the actuator ring opening, and where the handle actuator is operable between a water-on position, a neutral position, and a water-off position. A ratchet assembly is operatively connected to the valve stem of the valve assembly and has a valve stem portion and a handle portion. The handle portion engages the valve stem portion to increment the valve stem to a plurality of predefined open valve positions in response to each pivot of the handle actuator to the water-on position. The handle portion disengages from the valve stem portion in response to pivoting the handle actuator to the water-off position. A biasing member is disposed between the actuator ring and the valve assembly of the single lever faucet, where the biasing member automatically returns the handle actuator to the neutral position when the user pivots the handle actuator to the water-on position or the water-off position followed by the user releasing the handle actuator.

In another embodiment, the valve stem portion of the ratchet assembly includes a gear actuator on an upper end portion of the valve stem, and the handle portion includes a pawl pivotably attached to the handle actuator and a pawl release attached to the valve assembly. Moving the faucet-valve coupler to the water-on position causes the pawl to engage the gear actuator and move the valve stem to one of the plurality of predefined open valve positions. Moving the faucet-valve coupler to the water-off position moves the valve stem to the closed valve position and causes the pawl to engage the pawl release and disengage the pawl from the gear actuator.

In another embodiment, the gear actuator has a plurality of gear slots, where each movement of the faucet-valve coupler from the neutral position to the water-on position increments the valve stem to one of the plurality of predefined open valve positions with an increased water flow rate compared to the previous valve position.

In another embodiment, the flow control assembly also has a valve-closing member on the faucet-valve coupler, where moving the faucet-valve coupler to the water-off position causes the valve-closing member to engage and move the valve stem to the closed valve position.

In some embodiments, a top surface of the actuator ring defines a pair of contoured top side portions positioned on opposite sides of the actuator ring opening, each of the pair of contoured top side portions having a middle contoured portion, a front contoured portion sloping down and away from the middle contoured portion, and a rear contoured portion sloping down and away from the middle contoured portion. The handle actuator defines a plurality of protrusions extending down towards the actuator ring. Each of the pair of contoured top side portions is shaped to accommodate an arc of rotation of the handle actuator and shaped to engage at least one of the plurality of protrusions in each of the neutral position, the water-on position and the water-off position. The contoured top side portions and the at least one of the plurality of protrusions interact in combination to provide vertical motion to the handle actuator thereby raising the handle actuator along the central vertical axis with respect to the actuator ring when the handle actuator is in the neutral position.

In some embodiments, the contoured top side portions and the plurality of protrusions interact in combination to make the biasing member compress non-linearly over the resultant vertical motion of the biasing member thereby providing more force to the neutral position of the handle.

Another aspect of the invention is directed to a method of controlling the flow of water from a single lever faucet. The method includes coupling a water flow control assembly between a handle of a single lever faucet and a valve assembly of the single lever faucet. The flow control assembly engages a valve stem of the valve assembly, is adapted to provide an increased handle resistance to a user when the handle is moved from a handle neutral position to a water on position, is adapted to automatically select a predefined valve stem position that is directly related to a predefined water flow when moving the handle from the neutral position to the water on position, and is configured to automatically return the handle to the handle neutral position after engagement by the user to the water on position or to the water off position.

In another embodiment of the method, the automatically selected flow position is based on the force applied by the user to the handle.

In another embodiment of the method, the method includes selecting a water flow control assembly that includes a hot water by-pass feature that enables rapid delivery of hot water.

In still another embodiment of the method, the method includes selecting a water flow control assembly that includes a resistance mechanism that provides force feedback to the user when the handle is moved to a non-indexed, further-open position that is not one of the predefined flow positions.

In another embodiment, there is disclosed a method of controlling the use of water from a faucet. The method includes providing an indexing system in a single lever faucet to control water flow from the single lever faucet. The indexing system includes (1) providing a predefined flow rate when the single lever faucet is moved from a closed flow position to a full open position, the predefined flow rate being less than a flow rate of a full open position for a single lever faucet without an indexing system, (2) providing a force-feedback to a user of the single lever faucet incorporating the indexing system wherein the force-feedback imparts an increased resistance force of the faucet lever proportional to the distance of travel of the lever from the closed position to the full open position, and (3) providing a predefined increase in flow rate with each subsequent movement of the lever of the faucet from the closed position to the full open position where the number of subsequent movements of the lever is predefined by the indexing system, each subsequent movement being available so long as the lever of the single lever faucet is not engaged to stop the flow of water from the single lever faucet.

BRIEF DESCRIPTION OF THE DRAWINGS

FIG. 20 is a side and front perspective view of the valve cartridge of FIG. 17 showing the assembled unit.

FIG. 21 is a perspective, exploded view of the assembly of FIG. 20 showing the components of the valve assembly and the actuator assembly.

FIG. 24 is a side, cross-sectional view of the valve cartridge of FIG. 20 showing the valve assembly in a closed valve position and the handle actuator in the neutral position.

FIG. 24A is a side, cross-sectional view of the valve cartridge of FIG. 20 taken through the left side of the actuator ring showing the contoured top side surface and the protrusions of the handle actuator.

FIG. 25 is a side view of the valve cartridge of the present invention showing the valve assembly in a partially-open position and the handle actuator in the first water-on position.

FIG. 25A is a side, cross-sectional view of the assembly of FIG. 25 taken through the left side of the actuator ring showing the contoured top side surface and the protrusions of the handle actuator in the position of the valve cartridge.

FIG. 26 is a side view of the valve cartridge of the present invention showing the valve cartridge in a partially-open position and the handle actuator in the neutral position.

FIG. 26A is a side, cross-sectional view of the assembly of FIG. 26 taken through the left side of the actuator ring showing the contoured top side surface and the protrusions of the handle actuator in the neutral position.

FIG. 27 is a side view of the valve cartridge of the present invention showing the valve cartridge in a full water-on position and the handle actuator in the full water-on position.

FIG. 27A is a side, cross-sectional view of the assembly of FIG. 27 taken through the left side of the actuator ring showing the contoured top side surface and the protrusions of the handle actuator in the position of the valve cartridge.

FIG. 28 is a side view of the valve cartridge of the present invention showing the valve cartridge in a full water-on position and the handle actuator in the neutral position.

FIG. 28A is a side, cross-sectional view of the assembly of FIG. 28 taken through the left side of the actuator ring showing the contoured top side surface and the protrusions of the handle actuator in the neutral position.

FIG. 29 is a side view of the valve cartridge of the present invention showing the valve cartridge in a full water-on position and the handle actuator in the neutral position.

FIG. 29A is a side, cross-sectional view of the assembly of FIG. 29 taken through the left side of the actuator ring showing the contoured top side surface and the protrusions of the handle actuator in the position of the valve cartridge.

DETAILED DESCRIPTION OF THE INVENTION

Figure 1:
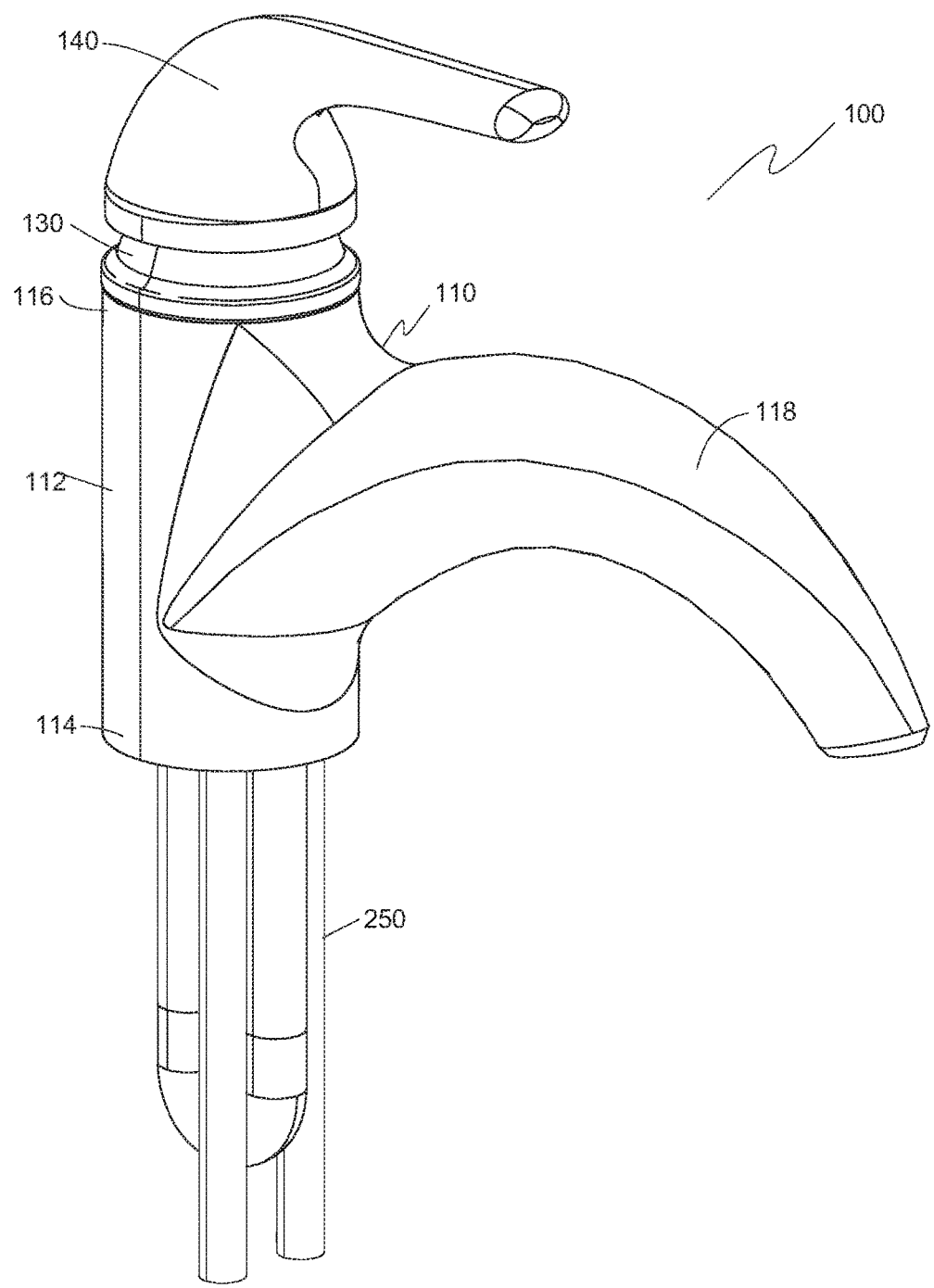
FIG. 1 is a perspective view of one embodiment of single lever faucet of the present invention.

The present invention is illustrated in FIGS. 1-29. FIG. 1 shows a perspective illustration of one embodiment of a single lever faucet 100 that includes a housing 110, a handle 140, and a valve manifold 250. A valve cartridge 159 and a water flow control assembly 160 (not visible) are disposed in housing 110. Housing 110 includes a faucet body 112 with lower end 114 and an upper end 116 and a spigot 118 that extends transversely from faucet body 112. A flow control cover 130 is disposed between handle 140 and faucet body 112 and abuts upper end 116 of faucet body 112. Flow control cover 130 conceals portions of valve cartridge 159 and water flow control assembly 160. A portion of valve manifold 250 is shown extending out from lower end 114 of housing 110.

Figure 2:
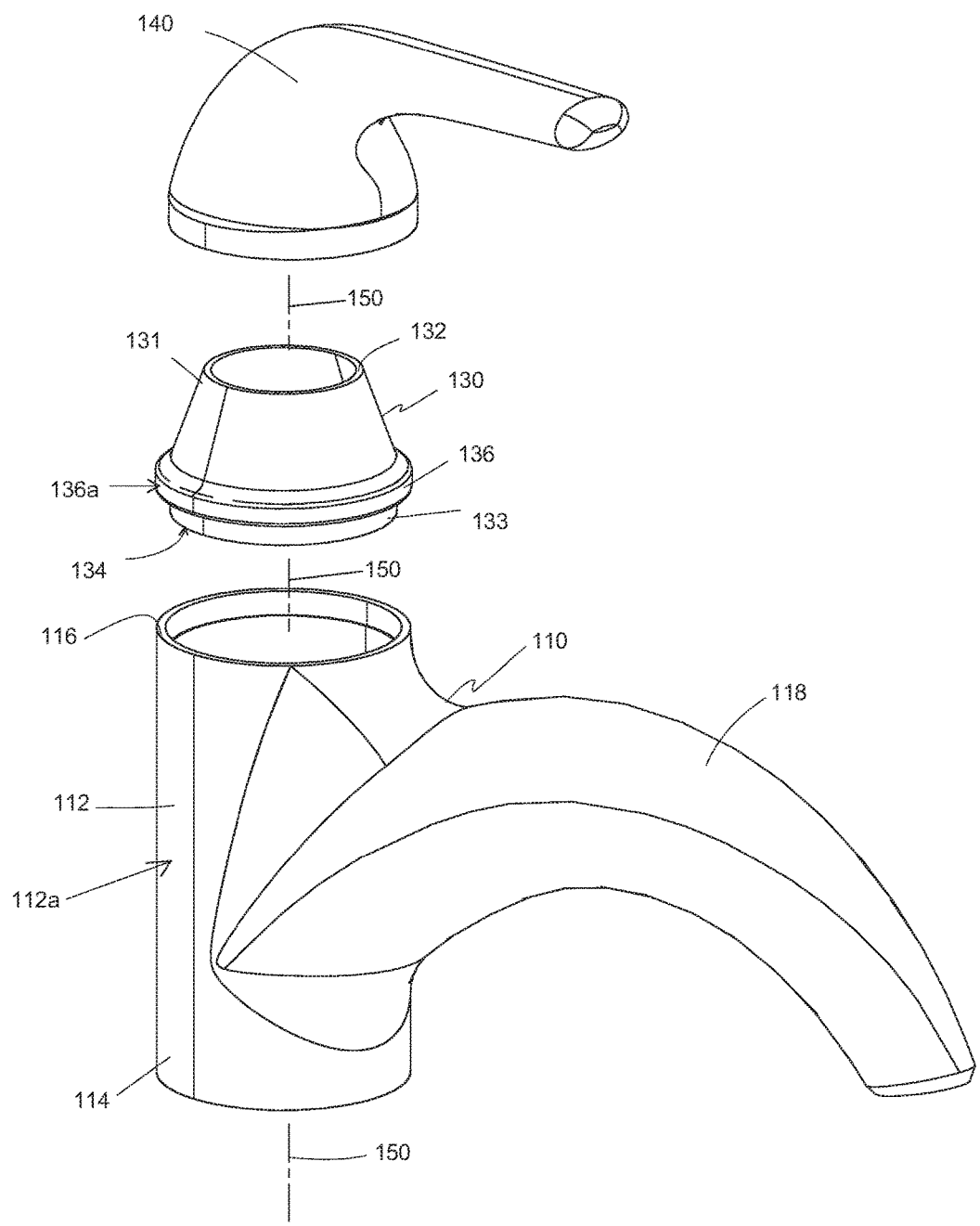
FIG. 2 is a perspective, exploded view of a faucet housing showing a handle, a flow control cover, and a faucet body.

Referring now to FIG. 2, a perspective illustration shows housing 110, flow control cover 130, and handle 140 in an exploded view. In one embodiment, faucet body 112 has the general shape of a hollow cylinder and extends along a central vertical axis 150 from open upper end 116 to open lower end 114. Spigot 118 is also hollow and joins faucet body 112.

Flow control cover 130 is hollow and has a frustoconical shape extending axially along central vertical axis 150. An upper cover end portion 131 has upper flow control cover opening 132 and a lower cover end portion 133 has lower flow control cover opening 134. A flange 136 extends circumferentially around and extends radially outward from lower cover end portion 133 of flow control cover 130. Outer flange diameter 136a is substantially equal to an outer body diameter 112a of faucet body 112. Therefore, lower cover end portion 133 is received in upper end 116 of faucet body 112 with flange 136 close to or abutting upper end 116. Flow control cover 130 attaches to faucet body 112 by a threaded connection, frictional fit, snap fit, or loose fit between flow control cover 130 and body portion 112.

Figure 3:
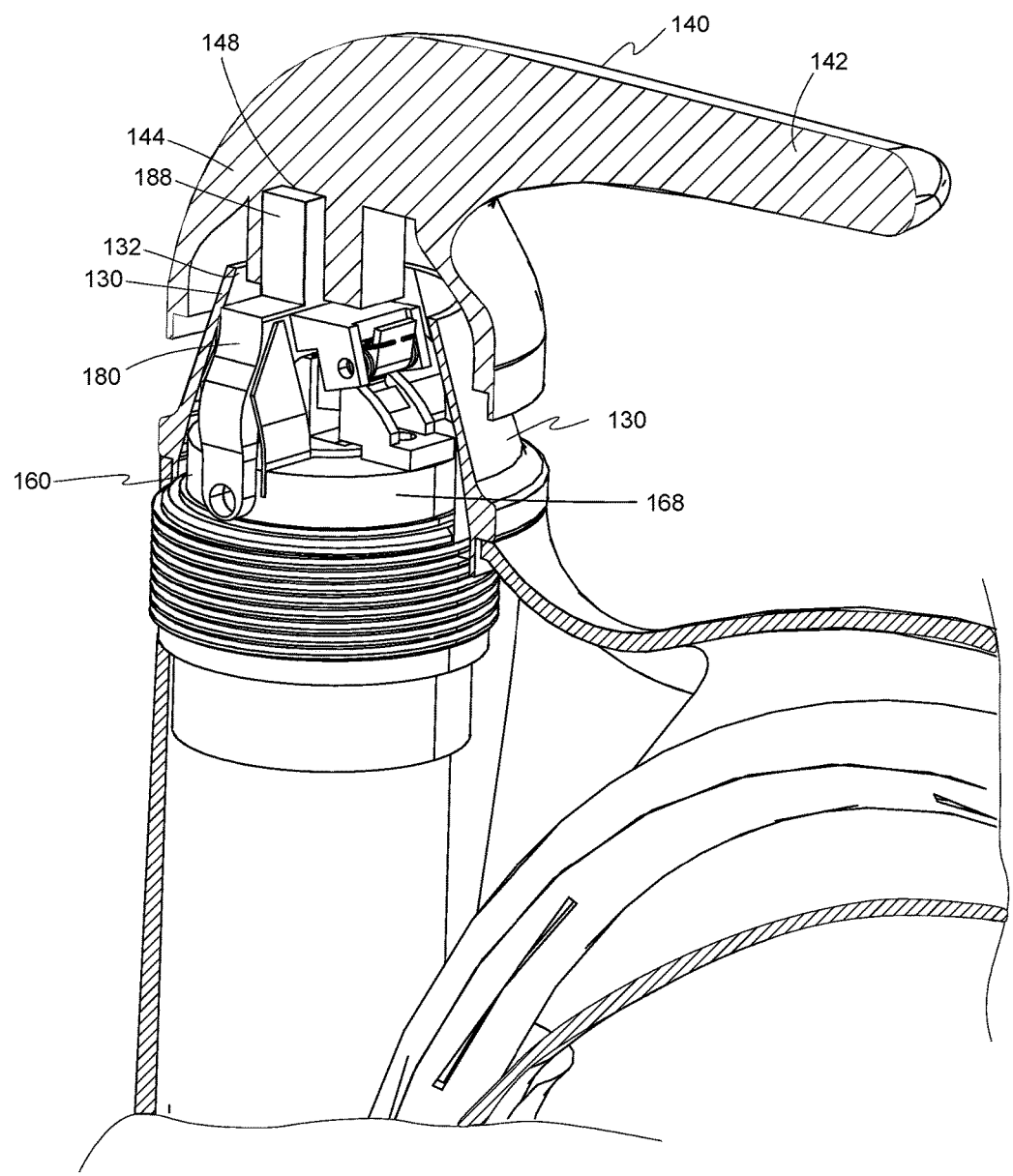
FIG. 3 is a perspective, partial cutaway view of a single lever faucet showing portions of the valve assembly.

Referring now to FIG. 3, a perspective, partial sectional view of single lever faucet 100 shows a section of handle 140, a section of flow control cover 130, one embodiment of a water flow control assembly 160 attached to a valve stem 165, and an upper portion 254 of valve manifold 250. In one embodiment, a faucet valve coupler 179 includes a handle actuator 180 pivotally connected to an actuator ring 168.

Water flow control assembly 160 includes a cam mechanism 189 and a handle biasing member 172. Components of water flow control assembly 160 are discussed in more detail below with reference to FIGS. 4 and 5.

Handle 140 has a handle stem 142 and a handle body 144. In one embodiment, handle body 144 defines a hollow region 146 sized to receive upper cover end portion 131 of flow control cover 130 and to permit handle body 144 to pivot and rotate about central vertical axis 150 during operation of single lever faucet 100. Handle body 144 also defines an opening or stem recess 148 for operatively connecting to valve cartridge 159.

Flow control cover 130 partially encloses valve cartridge 159. Flow control cover 130 allows actuator element 188 of a handle actuator 180 to extend upwardly through upper flow control cover opening 132 to engage stem recess 148 of handle 140. By connecting to handle actuator 180 and having a water flow control assembly 160 operatively connected between handle 140 and valve stem 165, handle 140 is used to operate valve stem 165.

Figure 4:
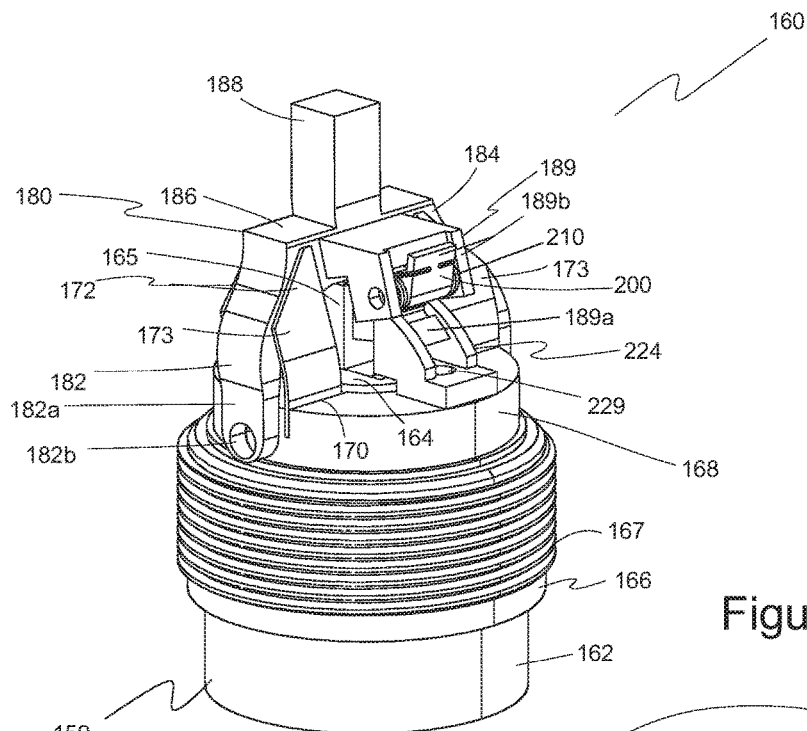
FIG. 4 is a perspective view of the valve assembly of FIG. 3.
Figure 5:
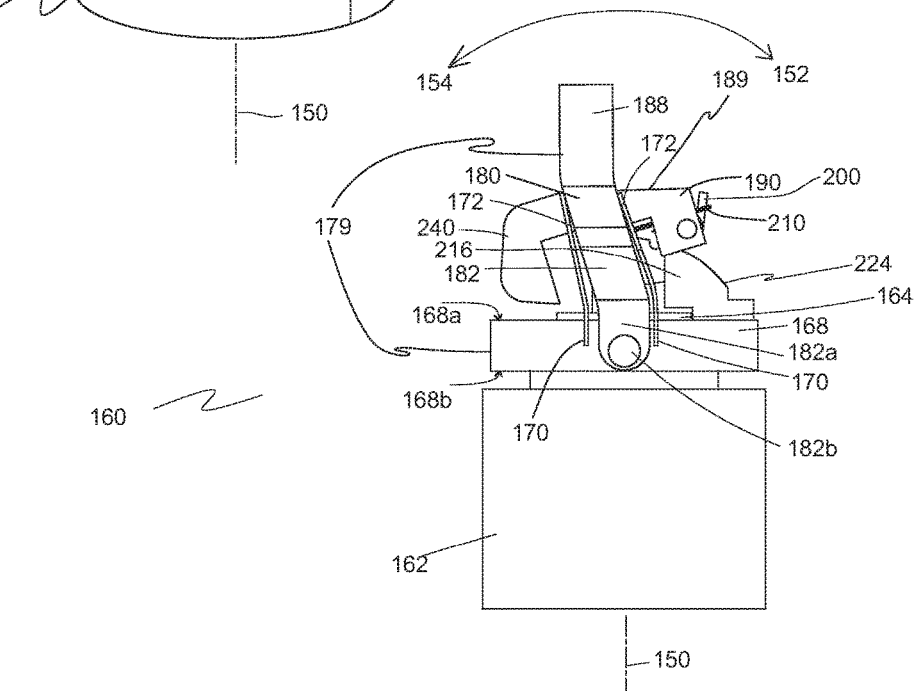
FIG. 5 is a side view of the valve assembly of FIG. 4 shown for clarity purposes without the cartridge lock.

Referring now to FIGS. 4 and 5, a front perspective view and a side view, respectively, illustrate one embodiment of water flow control assembly 160 attached to valve cartridge 159. A valve body 162 has a cylindrical shape with a void to receive a regulator 164 (not visible). A valve stem 165 extends upwardly from valve cartridge 164. Valve cartridge 159 controls the relative quantities of hot and cold water dispensed by single lever faucet 100, as is well known in the art. A cylindrical cartridge lock 166 (not shown in FIG. 5) comprising a plurality of threads 167 is adapted to be secured to valve body 162. Cartridge lock 166 enables valve cartridge 159 to be threadably received by and maintained in valve manifold 250, which is discussed in more detail below.

A faucet valve coupler 179 connects handle 140 to valve cartridge 159. Faucet valve coupler 179 rotates and includes an actuator ring 168 and a handle actuator 180. Actuator ring 168 is connected to valve body 162 and is rotatable with valve stem 165. In one embodiment, actuator ring 168 has an annular shape with a top surface 168a, a bottom surface 168b, an actuator ring opening 168a sized to receive and rotate about regulator 164, and a plurality of slots 170. In another one embodiment, actuator ring 168 has a perimeter wall 168e (not shown) that extends vertically below bottom surface 168b similar to a cap. Perimeter wall 168e partially encloses or is received in valve body 162. In one embodiment, slots 170 extend into top surface 168a of actuator ring 168 to receive an end or ends of a biasing member 172. In the embodiment of FIGS. 4-5, biasing member 172 comprises a plurality of spring plates 173 positioned on opposite faces of handle actuator 180. Biasing member 172 extends upwardly from actuator ring 168 to engage handle actuator 180.

A handle actuator 180 has a first arm 182, a second arm 184 spaced apart and generally perpendicular to first arm 182, and an actuator body portion 186 extending transversely between and connecting first arm 182 to second arm 184. First arm 182, second arm 184, and actuator body portion 186 can be straight segments, curved segments, or have other shapes that generally define an inverted-U shape or arch that extends over valve cartridge 164. a handle portion 188 extends from actuator body portion 186 generally parallel to central vertical axis 150 in a direction opposite to that of first arm 182 and second arm 184. End 182a of first arm 182 and end 184a of second arm 184 each pivotably connect to opposite sides of actuator ring 168. In one embodiment, ends 182a, 184a abut an outside surface 168c of actuator ring 168 and have connector openings 182b, 184b, respectively, corresponding to connector openings 168d extending radially into or through actuator ring 168 (shown in FIG. 6). In such an embodiment, handle actuator 180 pivots about pins or connectors (not shown) extending into or through connector openings 182b, 184b of actuator ring 168. In other embodiments, ends 182a, 184a pivotably connect to top surface 168a of actuator ring 168 or other location suitable to permit rotation and pivoting of handle actuator 180 relative to central vertical axis 150.

As illustrated in FIG. 5, when handle actuator 180 is pivoted in a forward direction 152 (e.g., toward user) or backward direction 154 (e.g., away from user) about connector openings 182b, 184b, some or all of biasing member 172 engage handle actuator 180 to bias its return to a neutral position as shown in FIG. 5. For example, when biasing member 172 comprises spring plates 173, only some of spring plates 173 engage handle actuator 180 in the pivoted position since handle actuator 180 pivots out of engagement with the opposing spring plates 173. Operation of single lever faucet 100 is discussed in more detail below.

Still referring to FIGS. 4 and 5, a cam mechanism 189 includes a valve stem portion 189a and a handle portion 189b. Cam mechanism 189 can be a mechanical, electromechanical, or electrical mechanism that is used to incrementally adjust the position of valve stem 165, and therefore the flow of water through valve cartridge 159. In one embodiment in which cam mechanism is a mechanical mechanism, stem portion 189a includes an actuator gear 216 and handle portion 189b includes a pawl 200 connected directly or indirectly to handle 140. In one embodiment, a pawl mounting bracket 190 on handle actuator 180 pivotably connects pawl 200 to handle actuator 180.

Pawl 200 (shown more clearly in FIG. 6) is received in pawl mounting bracket 190 using one or more pins, fasteners, or the like extending through bracket through-openings 195. One or more pawl biasing member 210 are used to bias pawl 200 towards engagement with actuator gear 216. In one embodiment, pawl biasing member 210 is a torsion spring mounted to pawl mounting bracket 190 alongside pawl 200.

Actuator gear 216 is attached to valve stem 165. In one embodiment, a fastener, pin, or the like (not shown) extends from valve stem 165 into actuator gear 216 to directly connect actuator gear 216 to valve stem 165. Other mounting or connection methods are acceptable. Actuator gear 216 is discussed in more detail below with reference to FIG. 6.

A pawl-release member 224 is mounted to actuator ring 168. In one embodiment, a connector opening 229 extends completely through release cam member 224 for attaching pawl-release member 224 to top surface 168a of actuator ring 168. Other attachment methods are acceptable, including welding, adhesive, clips, and other means. It is contemplated that pawl-release member 224 and actuator ring 168 may also me molded into a single piece.

Figure 6:
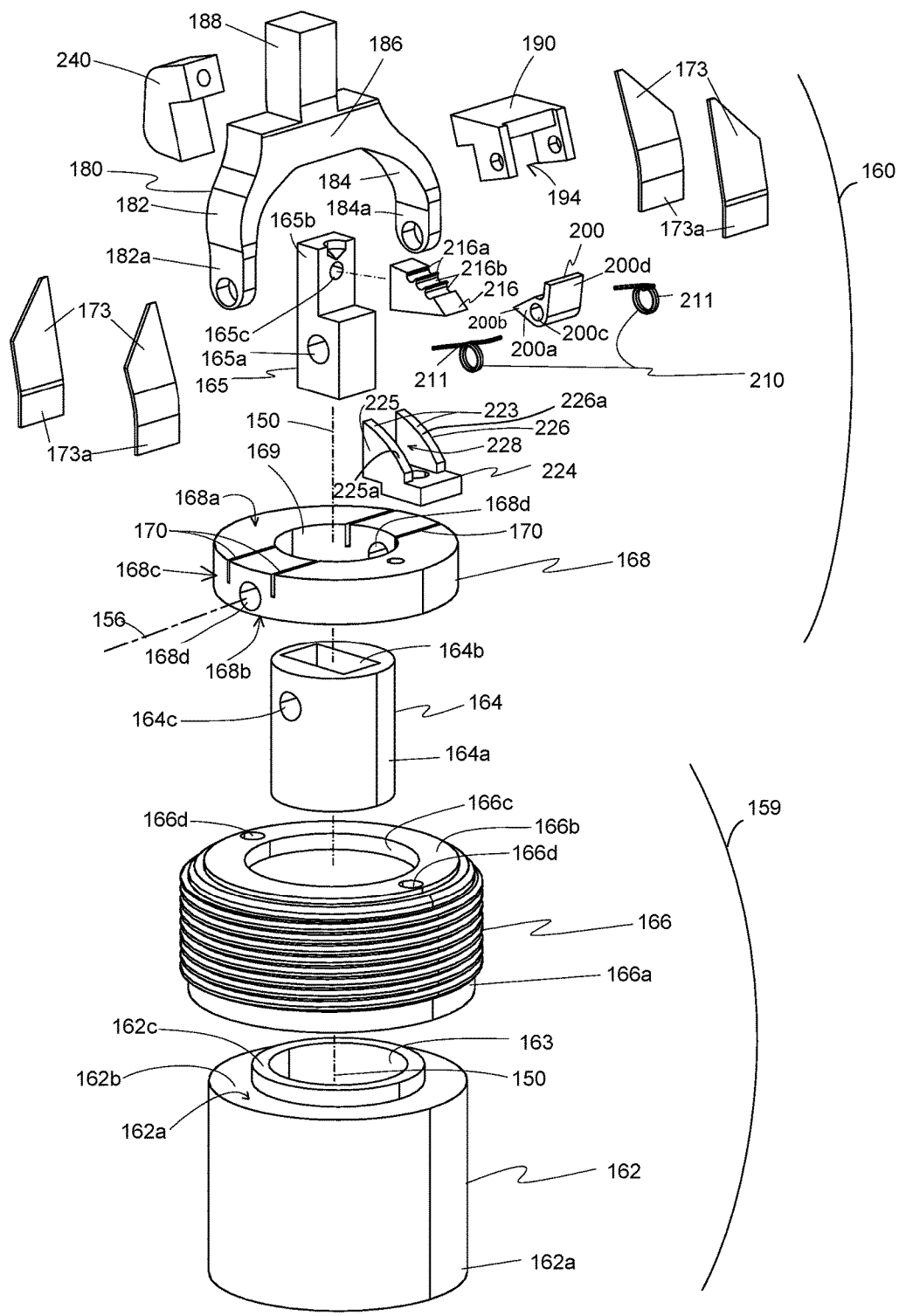
FIG. 6 is a perspective, exploded view of components of the valve assembly of FIG. 4.

Referring now to FIG. 6, a perspective exploded view shows components of one embodiment of water flow control assembly 160 coupled to valve cartridge 159. Valve cartridge 159 has a cylindrical valve body 162 that extends along central vertical axis 150 and has a cylindrical valve body opening 163 to receive regulator 164. Valve body upper surface 162a defines a shoulder 162b with a raised collar or lip 162c around valve body opening 163.

Figure 7:
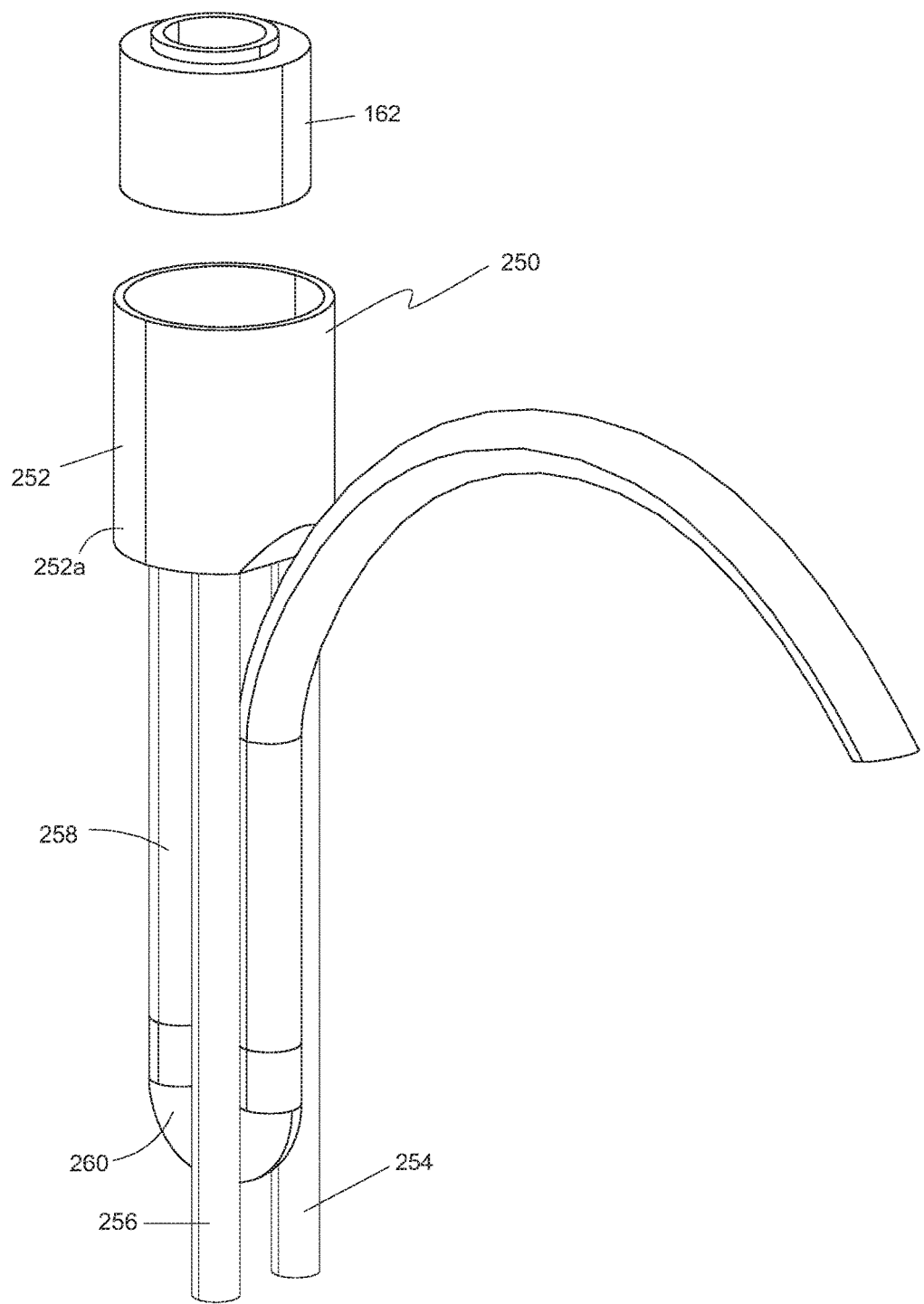
FIG. 7 is a perspective, exploded view of a valve housing and a valve manifold.

Valve body 162 has a cylindrical shape received by manifold 250 (shown in FIG. 7). Valve body 162 and regulator 164 together control the amount of water flowing from manifold 250 through valve cartridge 159. In some embodiments, valve body 162 and regulator 164 also control the balance between a first liquid (e.g., hot water) and a second liquid (e.g., cold water).

Cartridge lock 166 has a hollow cylindrical body portion 166a with external threads 167. An annular cartridge top 166b extends radially inward from body portion 166a and defines a central top opening 166c sized to receive collar 162c of valve body 162. Cartridge lock 166 slips over valve body 162 with cartridge top 166b in contact with shoulder 162b and with collar 162c substantially flush with cartridge top 166b.

Regulator 164 has a cylindrical body 164a with a rectangular through-opening 164b extending therethrough along central vertical axis 150. Through-opening 164b in other embodiments is oblong. Fastener openings 164c extend through regulator 164 transverse (e.g., perpendicular) to central vertical axis 150. When regulator 164 is received in valve body 162, fastener openings 164c are exposed above collar 162c of valve body 162. For clarity, the inlet and outlet openings typical of regulator 164 used in single lever water faucets are not shown. It is understood by those skilled in the art that regulator 164 may be any one of the designs/shapes typically used in single lever water faucets, such as spherical, cylindrical, and the like.

Actuator ring 168 has an annular shape with substantially parallel top surface 168a and bottom surface 168b. Fastener openings 168d extend from outside surface 168c through to actuator ring opening 169. When assembled, actuator ring 168 is aligned centered on central vertical axis 150 with valve cartridge 164 and valve body 162 with bottom surface 168b close to cartridge top 166b. Fastener openings 168d of actuator ring 168 align with fastener openings 164c of valve cartridge 164 where fasteners, pins or similar structure (not shown) extending through fastener openings 168d, 164c connect actuator ring 168 to valve cartridge 164. Actuator ring 168 is attached to valve cartridge 164, which rotates within valve body opening 163 to control the proportions of a first liquid (e.g., hot water) and a second liquid (e.g., cold water) entering valve body 162 from manifold 250 (shown in FIG. 7).

Ends 173a of spring plates 173 are received in slots 170 in top surface 168a of actuator ring 168. In other embodiments, spring plates 173 are replaced by a flexure member substantially having an inverted-U shape with ends received in slots 170. Pawl release cam 224 as discussed above is fixed to top surface 168a of actuator ring 168 with release cam channel 228 directed toward central vertical axis 150. Pawl release cam 224 is fixed to top surface 168a using a fastener, pin, rivet, adhesive, or other suitable method. It is contemplated that pawl-release member 224 and actuator ring 168 may also be molded into a single piece.

Valve stem 165 is received in opening 164b of regulator 164 and configured to be secured with or without a fastener. In an embodiment where a fastener is used, one example includes a stem fastener opening 165a that extends through valve stem 165 transversely to central vertical axis and aligns with fastener openings 164c of regulator 164. To control the flow rate of liquids through valve cartridge 159, valve stem 165 pivots about a transverse pivot axis 165 extending through stem fastener opening 165a, fastener openings 168d of actuator ring 168, and fastener openings 164c of regulator 164.

Actuator gear 216 attaches to an upper portion 165b of valve stem 165. In one embodiment, a threaded fastener (not shown) extends through a cam attachment opening 165c to threadably engage actuator gear 216. It is contemplated that actuator gear 216 and valve stem 165 may also be molded into a single piece. In one embodiment, actuator gear has a wedge shape with a plurality of teeth 216a and cam slots 216b between adjacent teeth 216a. Other shapes for actuator gear 216 are also acceptable, such as a rod or wheel with teeth 216a and slots 216b. Examples of actuator gears include, but are not limited to, a plate cam, a cylindrical cam, a face cam, and a linear cam.

Handle actuator 180 has first arm 182, second arm 184, and actuator body portion 186 substantially defining an inverted-U shape. Handle portion 188 extends upwardly from actuator body portion 186 to engage handle 140 (shown in FIG. 3). Handle actuator 180 pivotally attaches to actuator ring 168 at arm end portions 182a, 184a, respectively, of first arm 182 and second arm 184. In one embodiment, handle actuator 180 pivots about transverse pivot axis 156 with the inverted-U shape pivoting over valve stem 165. In one embodiment, actuator element 188 aligns with valve stem 165 as a virtual extension of valve stem 165.

In another embodiment, handle actuator 182 comprises biasing member 172 made of relatively flat and thin metal that is flexible and resilient. In such an embodiment, ends 182a, 184a of handle actuator 182 are received in slots 170 of actuator ring 168. It is contemplated that a torsion spring may be installed between actuator ring 168 and handle actuator 182 to impart a biasing action to actuator ring 168 instead of the flat, thin metal of biasing member 173 shown in FIGS. 5 and 6.

In one embodiment, pawl mounting bracket 190 has a first side member 191, a second side member 192 and a top member 193 extending between and connecting first side member 191 to second side member 192, where pawl mounting bracket 190 defines a bracket passageway 194 below top member 193 and between first side member 191 and second side member 192. In one embodiment each of first side member 191 and second side member 192 defines a bracket through-opening 195 extending transversely therethrough. Pawl mounting bracket 190 attaches to actuator body portion 186 of handle actuator 182 with first side member 191 and second side member 192 extending downwardly towards actuator gear 216. Pawl 200 is pivotably mounted between first side member 191 and second side member 192. In one embodiment, pawl 200 has a wedge-shaped pawl body 200a with a gear-engaging portion 200b, such as a tip or point, and a recess or through-hole 200c for mounting to pawl mounting bracket 190. A pawl lever 200d extends transversely from pawl body 200a.

One or more pawl biasing members 210 bias pawl 200 towards an engaged position with actuator gear 216 where gear-engaging portion 200b engages or is positioned to engage a slot 216b on actuator gear 216. In one embodiment, pawl biasing member 210 is one or more torsion springs 211 having a coil 211a, an extension arm 211b, and an engaging arm 211c. Torsion spring(s) 211 are mounted alongside pawl 200 between first side member 191 and second side member 192 of pawl mounting bracket 190. In such an embodiment, a pin or fastener used to mount pawl 200 also extends through coil 210a. Extension arm 200b extends into or through bracket passageway 194 and engaging arm 210c bends to engage pawl lever 200d. With this arrangement, tension springs 211 exert a force on pawl lever 210d that causes pawl to pivot with gear-engaging portion 200b in a position to engage actuator gear 216. In other embodiments, a protrusion or notch on first side member 191 and/or second side member 192 is used to retain pawl 200 where pawl 200 would have corresponding recesses or axles on the sides of pawl body 200a, respectively.

Pawl release cam 224 has a first release cam member 225 and a second release cam member 226 spaced apart and substantially parallel to each other. A bottom release cam member 227 extends between and connects first release cam member 225 to second release cam member 226. First and second release cam members 225, 226 extend generally upward in a direction parallel to central vertical axis 150 from top surface 168a and/or from bottom release cam member 227. First and second release cam members 225, 226 define a release cam channel 228 therebetween sized to receive actuator gear 216.

A pawl release surface 223 on pawl release cam 224 releases pawl 200 from engagement with actuator gear 216. In one embodiment, pawl release surface 223 includes one or both of top surfaces 225a, 226a of first and second release cam members 225, 226, respectively. In such an embodiment, first and second release cam members 225, 226 contacting pawl 200 as handle actuator 180 (and pawl 200) pivot towards a water off position, thereby causing pawl 200 to pivot out of engagement with slot 216b of actuator gear 216. This occurs because pawl 200 is wider than cam channel 228, therefore pawl 200 engages pawl release surface 223, which includes one or both of top surfaces 225a, 226a of first and second release cam members, respectively. In other embodiments, pawl biasing members 210 engage first release cam member 225 and second release cam member 226, thereby releasing the bias on pawl 200 and causing pawl 200 to disengage from actuator gear 216.

In one embodiment, when handle 140 is moved to a water off position and pivots handle actuator 180 forward as viewed in FIG. 6, extension arms 210b of torsion springs 211 engage pawl release surface 223 that includes top sloping surface of first and second release cam members 225, 226, respectively. As handle actuator 180 pivots further forward, pawl release surface 223 on first and second release cam members 225, 226 engage with and pivot pawl 200 to a disengaged position where gear-engaging portion 200b is lifted/pivoted and disengaged from actuator gear 216.

In one embodiment, a valve closing member 240 is attached to or formed on actuator body portion 186 of handle actuator 180 opposite of pawl mounting bracket 190 (i.e., valve closing member 240 is attached to the back side of handle actuator 180) In one embodiment, valve closing member 240 is substantially L-shaped with a first closer portion 241 connecting transversely to actuator body portion 186 and a second closer portion 242 extending downwardly towards actuating ring 168. Valve closing member 240 restricts the throw of handle 140 in an upwards pivot of the handle towards an open position by second closer portion 242 contacting actuator ring 168. When handle 140 is operated to the water off position with a downwards pivot of handle 140, second closer portion 242 engages valve stem 165 to return it to its vertical or off position. In other embodiments, valve closing member 240 is optionally replaced with a catch or protrusion from handle actuator 180 or other component that closes valve stem 165 when handle 140 is moved to the water off position. That is, it is like a desmodromic valve in that valve closing member 240 has a different control function when actuated in different directions: valve closing member 240 acts as a stop when handle 140 is operated to the water on position; valve closing member 240 acts to close valve stem 165 when handle 140 is operated to the water-off position.

Referring now to FIG. 7, a perspective exploded view shows a schematic of one embodiment of valve manifold 250 and valve body 162. Valve manifold 250 has a manifold body 252 with a hollow cylindrical shape sized to receive valve cartridge 159 therein. A first liquid inlet 254 and a second liquid inlet 256 each connect to a bottom portion 252a of manifold body 252 to supply a first liquid (e.g., cold water) and a second liquid (e.g., hot water) to valve body 162. A liquid outlet 258 also connects to bottom portion 252a of manifold body 252 to deliver liquid(s) permitted to pass through valve cartridge 159. Optionally, liquid outlet 258 connects to a U-shaped junction connector 260 and to a liquid delivery conduit 262 to spigot 118.

In use, single lever faucet 100 uses indexed flow to save water by giving the user more control over the flow rate. Embodiments of single lever faucet 100 have handle 140 that is normally in a neutral handle position (e.g., horizontal), whether the water is off or whether the water is on. Using a biasing member 172, handle 140 is biased to a neutral handle position and can be pushed up to a water-on position to open water flow or pushed down to a water-off position to close water flow. When handle 140 is released, it returns to the neutral handle position.

Figure 8:
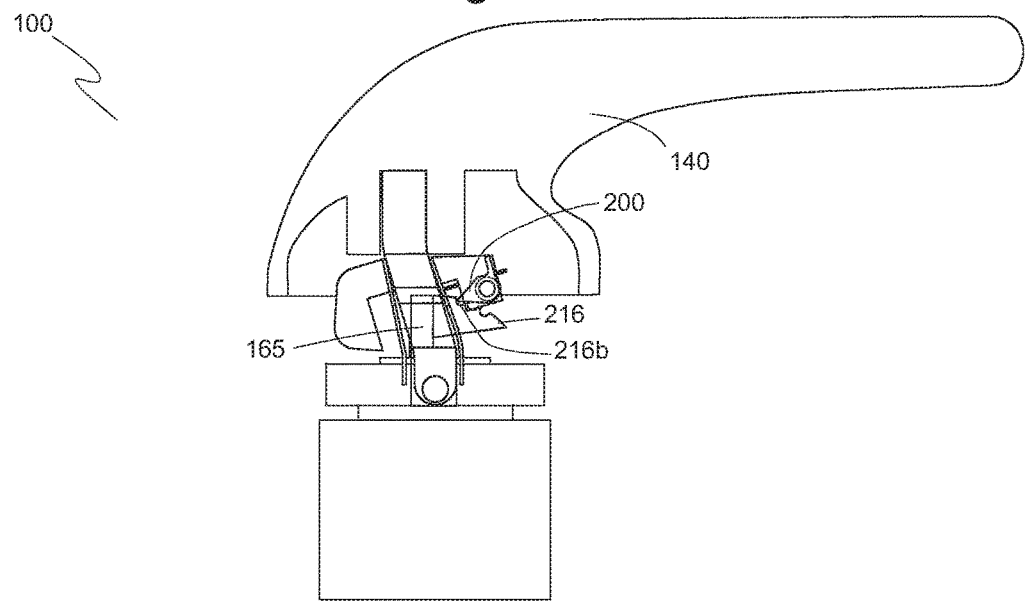
FIG. 8 is a side view showing a valve assembly and handle in a water off position.

Referring to FIG. 8, a side view shows single lever faucet 100 with handle 140 in a neutral handle position with water flow off as indicated by valve stem 165 being in a vertical or water-off position. Pawl 200 engages or is positioned to engage a first one of the slots 216b or teeth 216a on actuator gear 216.

Figure 9:
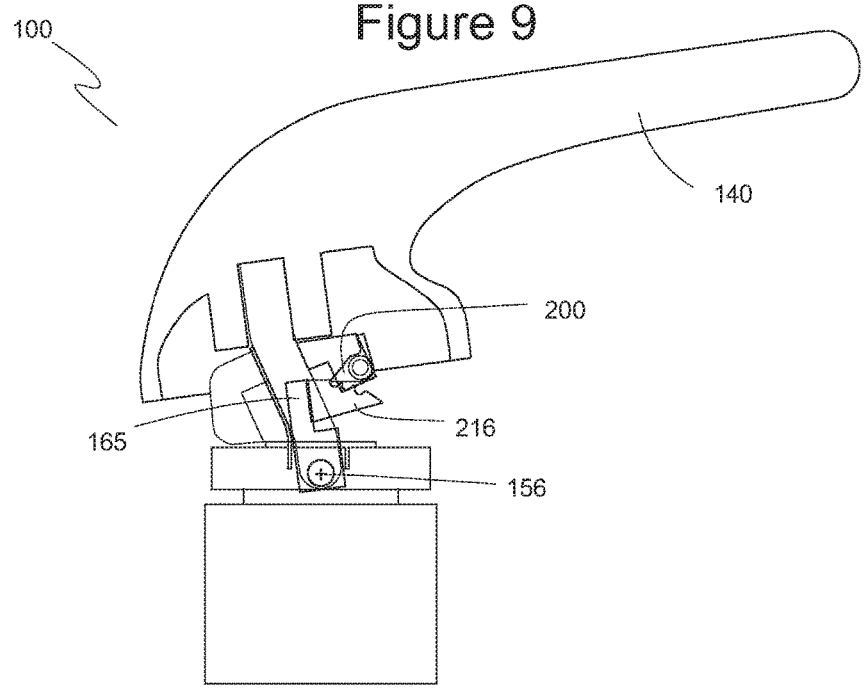
FIG. 9 is a side view showing the valve assembly and handle in a water on position.

Referring to FIG. 9, a side view illustrates single lever faucet 100 with handle 140 in a water-on position. With handle 140 pushed upwards, handle actuator 180, pawl mounting bracket 190, and pawl 200, which are all connected, rotate about transverse pivot axis 156 by an amount determined by the throw of handle 140. This rotation moves actuator gear 216, which is attached to valve stem 165, causing valve stem 165 to open and to allow water to flow at a rate R1 proportional to this valve opening. Rate R1 is the lowest rate of flow and is ideal for activities such as brushing one's teeth.

Figure 10:
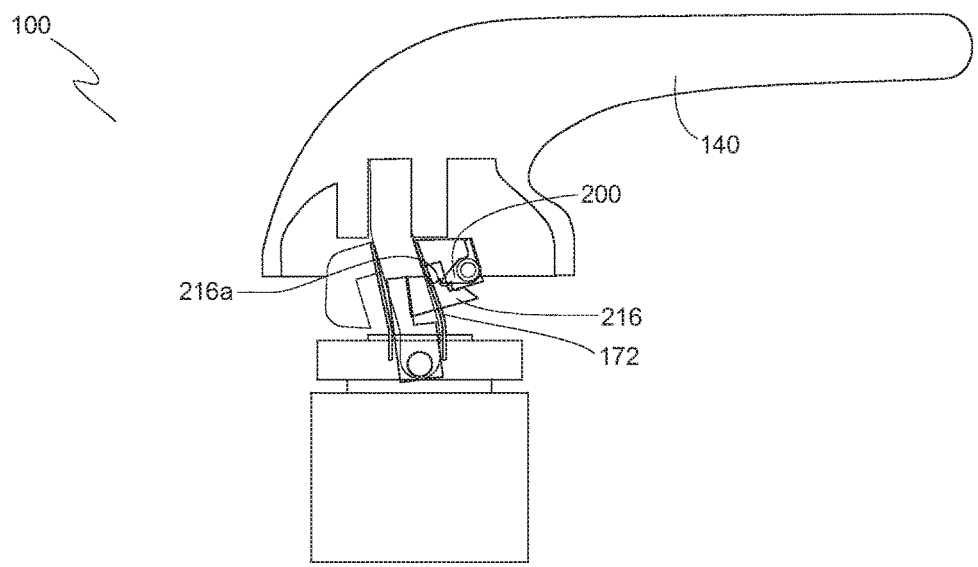
FIG. 10 is a side view showing the valve assembly and handle with the handle returned to the neutral handle position and the valve still in the water on position.

Referring to FIG. 10, single lever faucet 100 is shown with handle 140 having returned to the neutral handle position. When handle 140 was released after being lifted to the water-on position shown in FIG. 9, biasing member 172 returned handle 140 to the neutral handle position. Pawl 200 is now engaging or positioned to engage the second one of slot 216b or tooth 216a of actuator gear 216 in preparation for the next index move, if any, of handle 140 upward to the water-on position.

Figure 11:
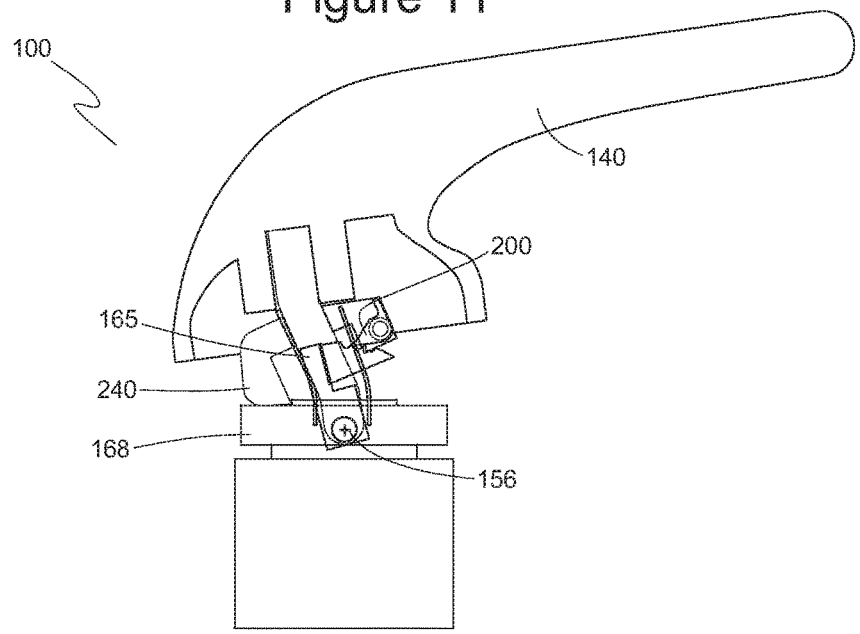
FIG. 11 is a side view showing the valve assembly and handle with the handle operated a second time to a water on position and the valve assembly moved incrementally to a second water on position.

Referring to FIG. 11, single lever faucet 100 is shown again in the water-on position after the first return to the handle neutral position. When handle 140 is raised and released a second time, valve stem 165 is further rotated about transverse pivot axis 156 to a second water-on position. The flow rate is increased incrementally to a flow rate R2 (e.g., medium flow) suited to quickly filling a coffee cup or small vessel, for example. As with each open position, valve closing member 240 contacts actuator ring 168 to define the end point of the range of motion ("throw") of handle 140.

Figure 12:
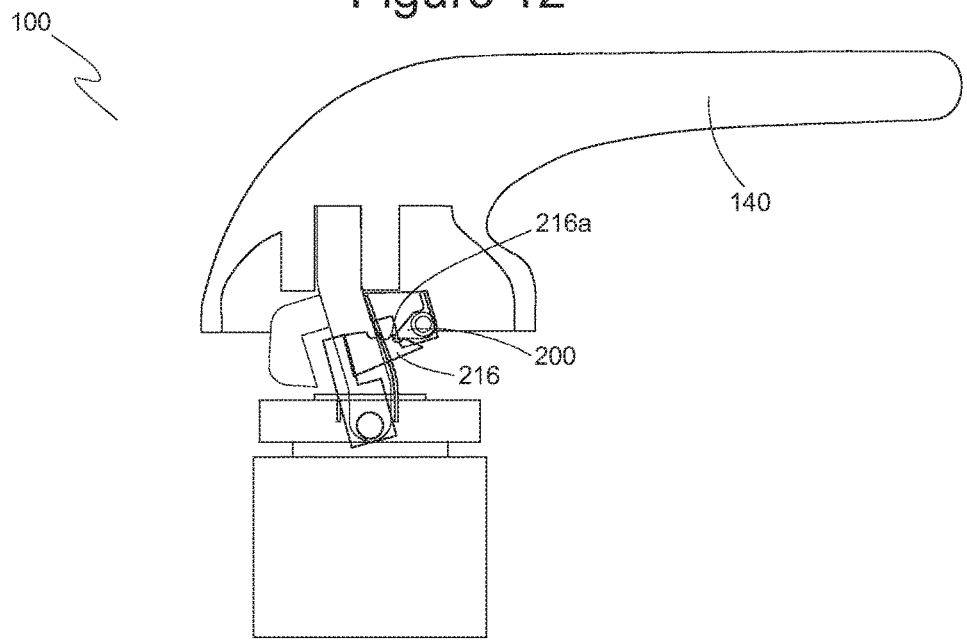
FIG. 12 is a side view showing the valve assembly and handle with the handle returned to the neutral handle position after being operated the second time to the water on position and where the valve assembly remains in the second water on position.

Referring to FIG. 12, single lever faucet 100 is shown with handle 140 having returned a second time to the neutral handle position. Pawl 200 is now engaging or positioned to engage the third one of slot 216b or tooth 216a of actuator gear 216 in preparation for the next operation of the handle 140, if any.

Figure 13:
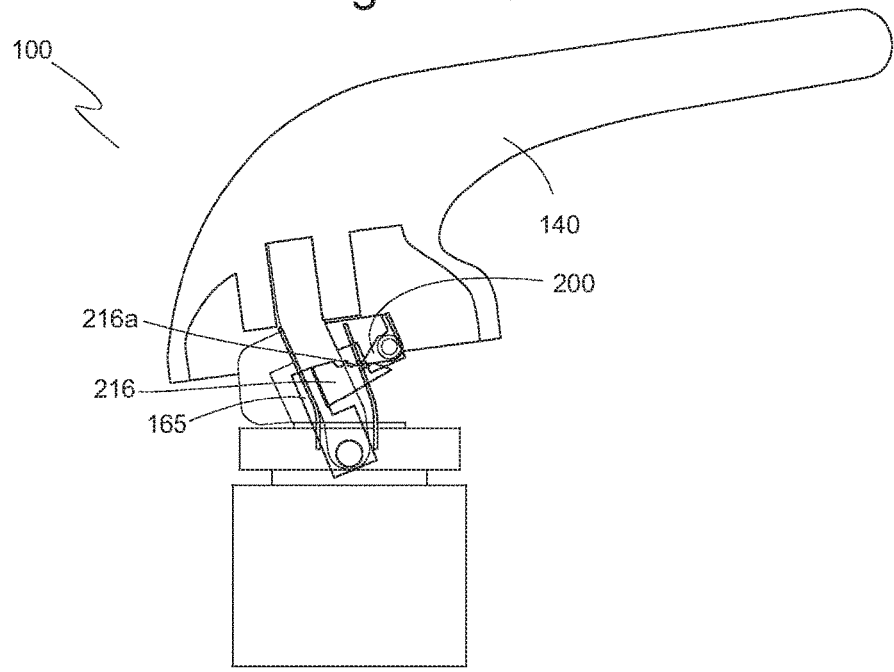
FIG. 13 is a side view showing the valve assembly and handle with the handle operated a third time to a water on position and the valve incrementally adjusted to the third water on position.

Referring to FIG. 13, single lever faucet 100 is shown in the water-on position a third time. When handle 140 is operated upward to the open position a third time, it increases the flow to a maximum flow rate R3, useful for filling large vessels or other situations in which large flow rates are required or desired. Valve stem 165 is pivoted to its fully-open water-on position. Pawl 200 remains engaged in the third tooth 216a of actuator gear 216.

Figure 14:
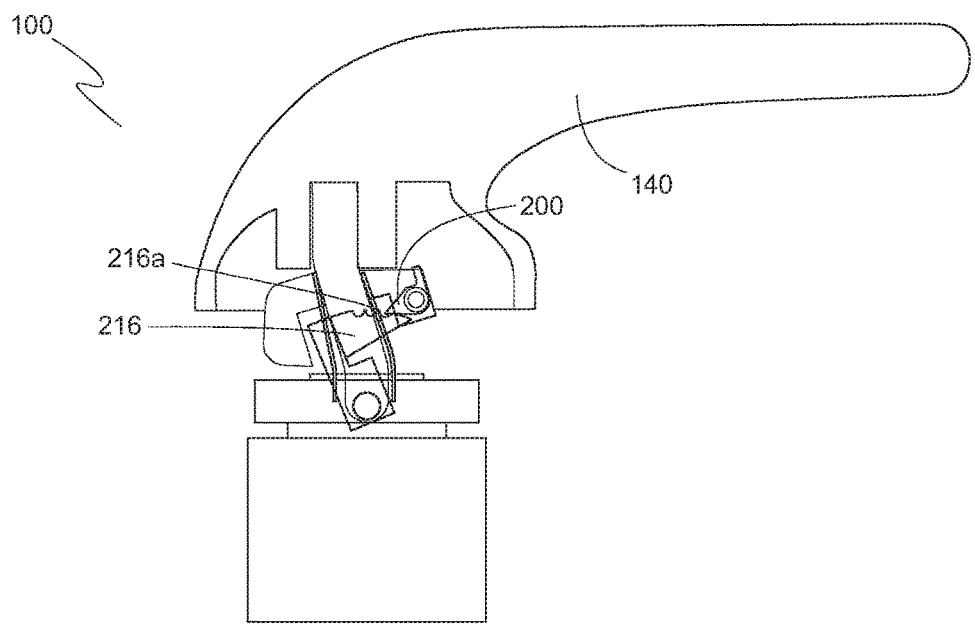
FIG. 14 is a side view showing the valve assembly and handle with the handle returned to the neutral handle position and the valve assembly remaining in the third water on position.

Referring to FIG. 14, single lever faucet 100 is shown with handle 140 having returned a third time to the neutral handle position. With no further slot 216b or tooth 216a to engage, pawl 200 is now abutting the third one of slot 216b or tooth 216a.

Figure 15:
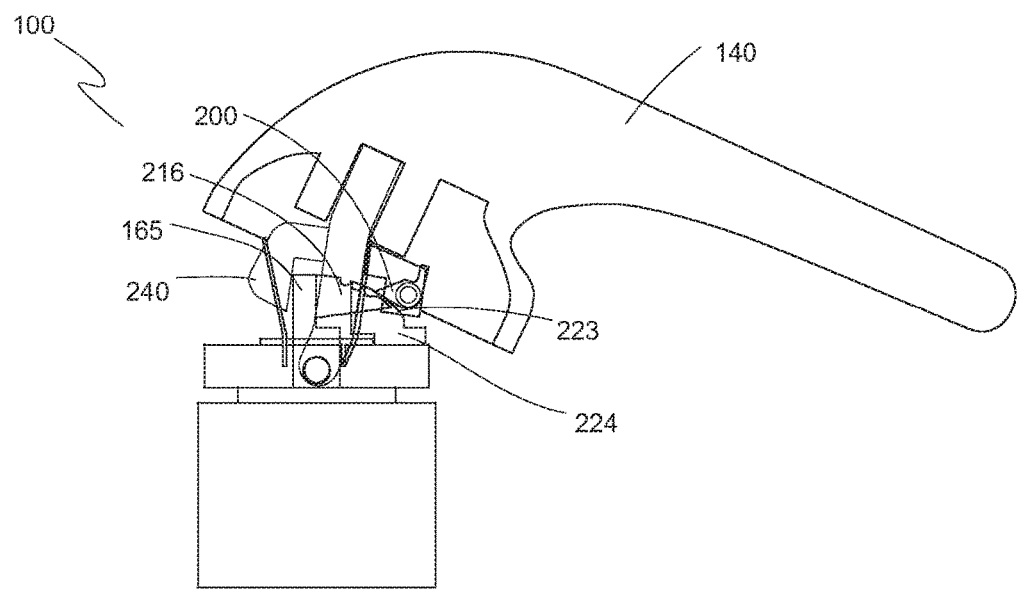
FIG. 15 is a side view showing the valve assembly and handle in a water off position.

Referring to FIG. 15, single lever faucet 100 is shown with handle 140 in the down or water-off position. At any point during operation of single lever faucet 100, pushing handle 140 down will cause valve closing member 240 to engage and pivot valve stem 165 to the vertical or water-off position, thereby causing the flow to stop completely. When handle 140 is pushed down, pawl release cam 224 also disengages pawl 200 from actuator gear 216 since pawl release surface 223 engages pawl 200 and pivots it against bias of biasing member 210 (shown in FIGS. 4-6) to a position of disengagement.

It is contemplated that single lever faucet 100 is not limited to three indexed levels of flow. Embodiments of single lever faucet 100 can accommodate more or fewer indexed flow steps as required. It should also be noted that with proper ratchet assembly design, the incremental flow rates can increase by dissimilar amounts from one flow rate to the next. Accordingly, water flow increases need not be linear increments. For example, the slots 216b and teeth 216a could be spaced such that the first open position allows two gallons per minute (GPM) to flow, the second open position allows eight GPM and the third open position allows 15 GPM and so on. Conversely, with a linear flow rate increase, slots 216b and teeth 216a would be evenly spaced and the flow rate increase for each operation of handle 140 upward to the open position would be the same increase in flow rate. Therefore, linear flow rate increases could provide flow rates R1, R2, and R3 of five, ten, and fifteen GPM, respectively.

Figure 16:
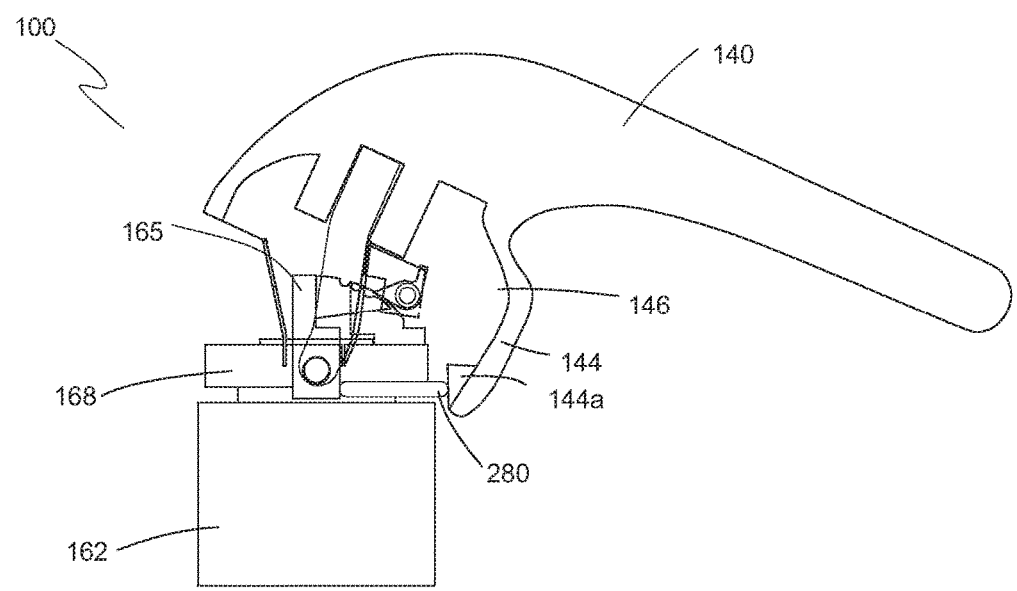
FIG. 16 is a side view of another embodiment of the valve assembly showing the valve assembly and handle in a water off position.

Referring to FIG. 16, another embodiment of single lever faucet 100 is shown. In this embodiment, valve assembly 160 includes a different type of valve closing member 240. Instead of the L-shaped design discussed above, valve closing member 140 in this embodiment is a closing member pin 280 that is slidably received in valve assembly 160. In one embodiment, closing member pin 280 extends through actuator ring 168 to contact valve stem 165. When handle 140 is operated to the water-off position, a sloped protrusion 144a on handle 140 extends into hollow region 146 of handle body 144 and engages closing member pin 280 to advance it towards lower portion 165c of valve stem 165, thereby causing valve stem 165 to pivot to its vertical or water-off position.

Figure 17:
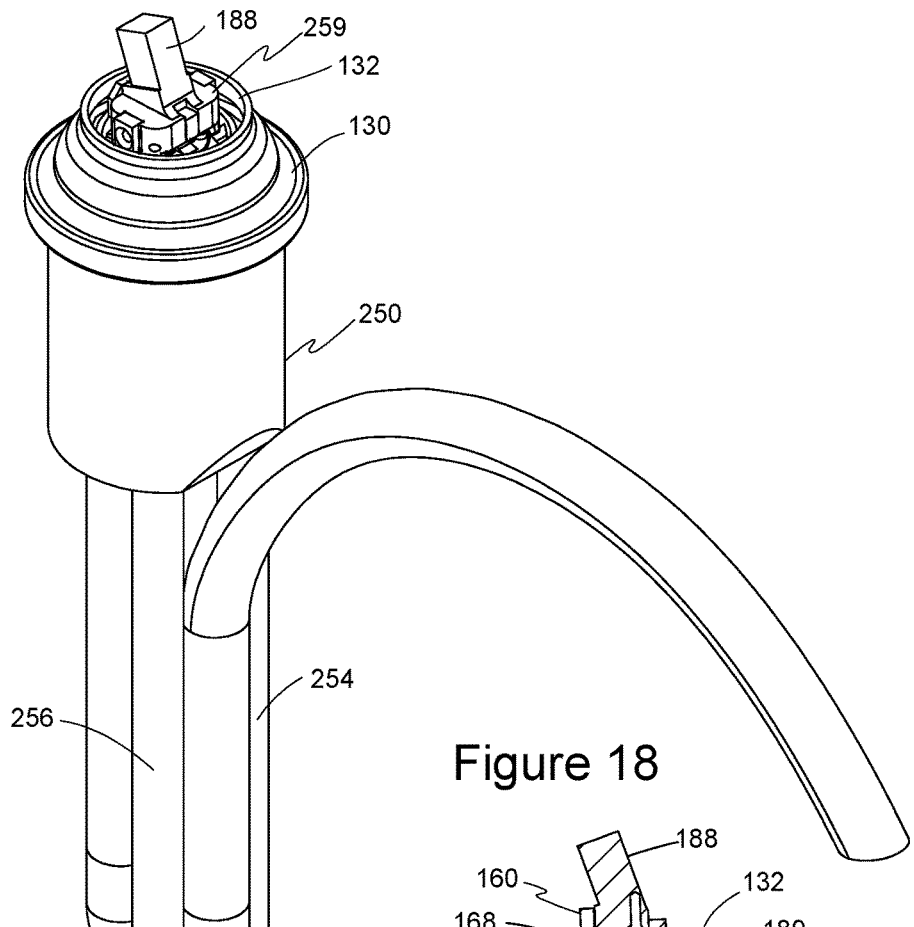
FIG. 17 is a perspective view of another embodiment of a valve cartridge and a valve manifold of the present invention.

Referring now to FIG. 17, a front and side perspective view illustrates another embodiment of the present invention. A valve cartridge 259 is more compact, has fewer components and is not configured to attach to existing valve stems of single lever faucets but is configured to replace the valve stems of a single lever faucet. FIG. 17 specifically illustrates flow control assembly 160 assembled with valve manifold 250 and flow control cover 130. These components may be used to retrofit an existing faucet or as components of a new faucet assembly. Actuator element 188 extends out from upper flow control cover opening 132 to operatively engage handle 140 (shown in FIGS. 1-3). First liquid inlet 254 and second liquid inlet 256 connect to valve manifold 250 to deliver hot and cold water to faucet 100.

Figure 18:
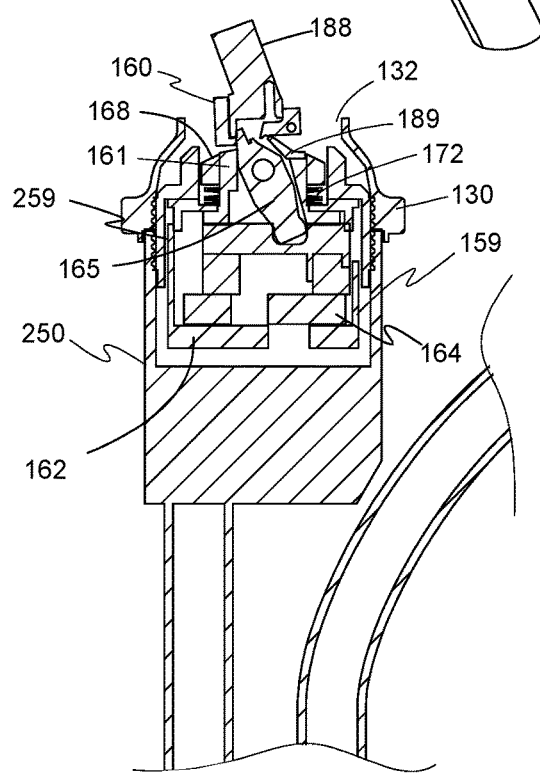
FIG. 18 is a side sectional view of FIG. 17 showing the valve cartridge disposed in the valve manifold.

Referring now to FIG. 18, a side sectional illustration shows valve cartridge 259 of FIG. 17 assembled with flow control cover 130 and valve manifold 250. Valve cartridge 259 includes valve assembly 159 and actuator assembly 175. Actuator assembly 175 interacts with valve assembly 159, which includes valve body 162, valve cartridge 164 (more clearly shown in FIG. 21) and valve stem stop 161. Valve cartridge 259 includes cam mechanism 189 configured as a ratchet assembly. Biasing member 172 is disposed between valve stem stop 161 and actuator ring 168. In one embodiment, biasing member 172 is a wave spring.

Flow control cover 130 is a decorative enclosure for valve cartridge 259 within valve manifold 250 and allows actuator element 188 to extend upwardly through upper flow control cover opening 132 to engage stem recess 148 in handle 140 shown in FIG. 3. By connecting to handle actuator 180 and having a water flow control assembly 160 operatively connected between handle 140 and valve stem 165, handle 140 is used to operate valve cartridge 259. When handle 140 moves actuator element 188, actuator ring 168 compresses at least a portion of the wave spring (biasing member 172), thereby exerting a force on actuator ring 168 to return handle 140 to the neutral position and the wave spring to an uncompressed or less compressed state.

Figure 19:
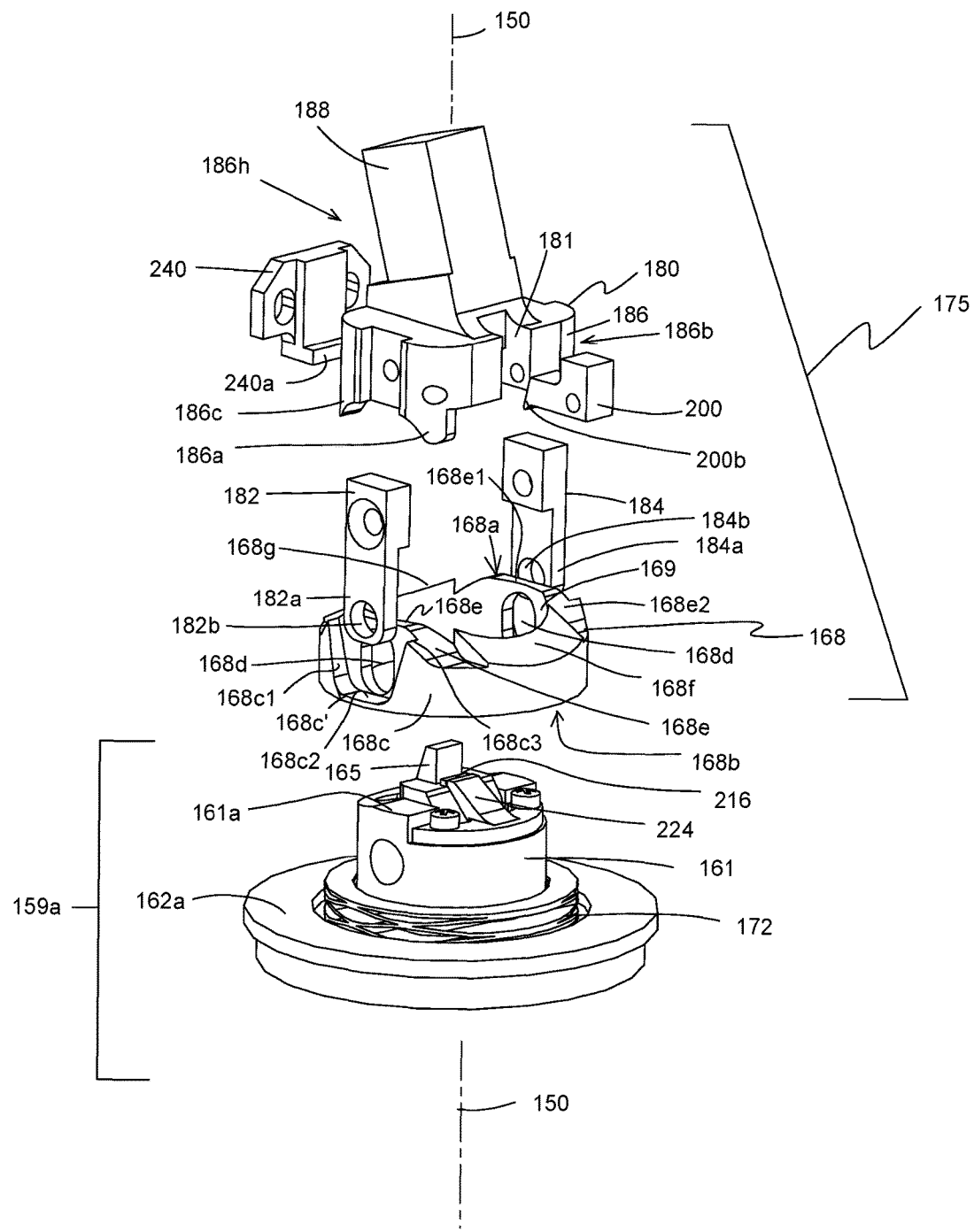
FIG. 19 is an exploded, front and side perspective view of components of FIG. 18 showing the actuator assembly and a top portion of the valve assembly.

Referring now to FIG. 19, a perspective exploded illustration shows one embodiment of actuator assembly 175 and an upper portion 159a of valve assembly 159. Similar to embodiments discussed above, actuator ring 168 generally has an annular shape with actuator ring opening 169 so it can be installed over valve stem stop 161. Actuator ring 168 also has top surface 168a and bottom surface 168b. When installed, bottom surface 168b of actuator ring 168 contacts biasing member 172 (e.g., a wave spring) with valve stem stop 161 extending up into or through actuator ring opening 169.

Handle actuator 180 includes actuator element 188 that extends up from actuator body portion 186 to engage handle 140 (shown in FIGS. 1-3). In one embodiment as shown, actuator element 188 is canted rearwardly as it extends up from actuator body portion 186. Actuator element 188 may extend along central vertical axis 150 or in other directions depending on the shape and configuration of stem recess 148 of handle 140. Handle actuator 180 also includes right and left front protrusions 186a, 186b (not visible) and right and left rear protrusions 186c, 186d (not visible) where each extends down from actuator body portion 186 to engage actuator ring 168. As viewed from above, protrusions 186a-d are positioned approximately on each of four "corners" of actuator body portion 186 even though actuator body portion 186 may be more round than square Handle actuator 180 pivotably attaches to actuator ring 168 with first arm 182 and second arm 184, which are rigidly secured to handle actuator 180 by fasteners (not shown) and extend down from opposite lateral sides of outside surface 168c in a spaced-apart, parallel relation. First arm 182 attaches to actuator body member 180 between left front protrusion 186a and left rear protrusion 186c; second arm 184 attaches to actuator body member 180 between right front protrusion 186b and right rear protrusion 186d. As with embodiments discussed above, handle actuator 180 with first and second arms 182, 184 generally defines an inverted-U shape (as viewed from the front) that pivotably attaches to actuator ring 168 and extends over valve stem stop 161.

End 182a of first arm 182 and end 184a of second arm 184 each pivotably connect to opposite sides of actuator ring 168. Actuator ring 168 has outside surface 168c with a recess 168c' on opposite sides for receiving ends 182a, 184a of first and second arms 182, 184, respectively. Recess 168c' extends from top surface 168a downward parallel to axis 150 to a predefined depth adjacent to and spaced from bottom surface 168b. Ends 182a, 184a attach to recess 168c' in outside surface 168c of actuator ring 168 and have connector openings 182b, 184b, respectively, corresponding to connector openings 168d in actuator ring 168. Recess 168c' has sides 168c1 that diverge from each other from a recess bottom 168c2 to a recess top 168c3. In such an embodiment, handle actuator 180 pivots about pins or connectors (not shown for clarity reasons) extending into or through connector openings 182b, 184b of actuator ring 168. Recess sides 168c1 limit the degree of pivotal movement of first and second arms 182, 184. In other embodiments, ends 182a, 184a pivotably connect to top surface 168a of actuator ring 168 or other location suitable to permit rotation and pivoting of handle actuator 180 relative to central vertical axis 150.

In one embodiment, fastener openings 168d on actuator ring 168 have an oval or vertically-elongated shape to permit handle actuator 180 to move vertically with respect to actuator ring 168 so that protrusions 186a-d do not bind on actuator ring 168 during forward or backward pivoting action about fastener openings 168d when biasing member 172 is compressed caused by the forward or backward movement of handle 140.

Top surface 168a of actuator ring 168 includes contoured top side portions 168e, a front sloped surface 168f and a rear sloped surface 168g. Each of contoured side portions 168e has a middle contoured side portion 168e1 that is relatively flat with a contoured front and rear portions 168e2 that slope down and away from middle contoured side portion 168e1 with a shape configured to accommodate the arc of rotation of handle actuator 180 and upon which protrusions 186a-d of actuator body portion 186 slide and/or ride. Contoured top side portions 168e may also be thought of as a cam surface upon which a cam rider (i.e. protrusions 186a-d) moves. Contoured side portions 168e are positioned opposite each other along the circumference of actuator ring opening 169. Front sloped surface 168f and rear sloped surface 168g are positioned at opposite sides of actuator ring opening 169 between contoured top side portions 168e.

In use, protrusions 186a-186d amplify the force exerted by biasing member 172 (e.g., a wave spring). Because protrusions ride on contoured surface 168e and because of the shape of contoured surface 168e having a higher middle contoured side portion 168e1 compared to contoured front and rear portions 168e2, protrusions 186a-186d by their position on contoured surface 168e extends the vertical height of handle actuator 180 along central vertical axis 150 when the handle 140 is in the neutral position. As handle 140 moves through a swing arc between the neutral position and the water-on and water-off positions, the movement of protrusions 186a-d over contoured surface 168e causes handle 140 to move up or down as protrusions 186a-d ride over contoured surface 168e and, in turn, causes the wave spring (the biasing member 172) to compress non-linearly over the resultant vertical motion of the spring. Consequently, this provides a more even biasing force close to the neutral position of the handle, which, in turn, provides a solid "on-center" feel at the neutral position (i.e. not floppy at the neutral position). In one embodiment, this "on-center" feel results from actuator 180 becoming "seated" on contoured side portions 168e forcing handle actuator 180 vertically higher relative to actuator ring 168 such that fastener pins occupy the top portion 168d1 of the elongated connector openings 168d. Thus, when handle 140 is in the neutral position, it feels seated in place with little or no play or slop in the neutral position.

When assembled, pawl 200 is partially received in a pawl slot 181 of actuator body member 186 and pivotably mounted to actuator body member 186. Gear-engaging portion 200b (or "tip") extends towards central vertical axis 150 and is positioned to interact at times with valve stem 165 or other component affecting the position of valve stem 165. Pawl-release member 224 is attached to a top surface 161a of valve stem stop 161 with which pawl 200 interacts when handle 140 is moved to the water-off position.

A valve closing member 240 is attached to or is formed on a rear portion 186h of actuator body portion 186. Valve closing member 240 extends downward from actuator body portion 186 and has a valve stem engaging surface 240a that is used to interact with valve stem 165 to move valve stem 165 from a full flow or a partial flow position to a flow off position, or from a full flow position to a partial flow position, or from any flow position to any other lesser flow position, including flow off position.

Referring now to FIGS. 20 and 21, perspective illustrations show valve cartridge 259 and flow control assembly 160 in assembled and exploded views, respectively. FIG. 20 omits flow control cover 130 and shows a cross section of cartridge lock 166 for clarity. Actuator member 188 is in the neutral position in FIGS. 20-21. Additionally, all of the fasteners and retaining pins that connect the various components together are omitted for clarity of the illustrated components.

Cylindrical valve body 162 extends along central vertical axis 150 and has a cylindrical valve body opening 163 to receive regulator 164. Valve body upper surface 162a defines a recessed collar 162c that is sized and positioned radially about central vertical axis 150 to receive biasing member 172. When valve cartridge 259 is assembled with cartridge lock 166 valve stem stop 161 extends through valve body upper surface 162a and into or through central top opening 166c of cartridge lock 166. Cartridge lock 166 is not essential to maintain components of valve cartridge 259 held together when it stands alone outside of faucet body 112. Typically, top surface 162a of valve body 162 is a cap that snaps into the housing or lower, cylindrical portion of valve body 162.

Typically, valve assembly 159 includes valve body 162, regulator 164, and valve stem 165, where regulator 164 includes valve stem stop 161 and disks 164d. Valve stem stop 161 defines through opening 164b extending therethrough along central vertical axis 150 to receive valve stem 165. Fastener axle openings 164c extend through an upper portion 161b of valve stem stop 161 transverse to (e.g., perpendicular to) both through-opening 164b and central vertical axis 150. When regulator 164 or disks 164d are received in valve body 162, fastener axle openings 164c are exposed above valve body upper surface 162a, which in this embodiment is constructed as an annular cap or top portion of valve body 162.

Upper portion 161b of valve stem stop 161 extends up through biasing member 172 and through or into actuator ring 168. When received in valve body 162, upper end 165b of valve stem 168 is positioned to engage pawl 200 and lower end portion 165d of valve stem 165 extends down through valve stem stop 161 to engage disks 164d of regulator 164. Here, regulator 164 is shown as a disk-type regulator 164, but regulator 164 may be any type used in single-lever faucets provided that regulator 164 is operable by valve stem 165.

Actuator ring 168 of flow control assembly 160 directly or indirectly engages biasing member 172 (e.g., a helical wave spring), which is received on valve body upper surface 162.

Actuator ring 168 may also impinge on the flange extending radially from valve stem stop 161 to act as a stop during operation of handle 140. Instead of a wave spring, biasing member 172 could be a plurality of coil springs or other compressible structures positioned between flow control assembly 160 and valve assembly 159, where biasing member 172 provides resistance to pivoting motion of actuator ring 168 and a resilient force to return actuator ring 168 (and handle 140) to the handle neutral position.

Pawl-release member 224 attaches to a forward section of top surface 161a of valve stem stop 161. Pawl-release member 224 alternately could be formed as part of or attached to actuator ring 168. In this embodiment, pawl-release surface 223 is a sloped surface or ramp-like structure that extends upwards and inwards towards central vertical axis 150 from the forward portion of top surface 161a of valve stem stop 161. In another embodiment, pawl-release member 224 is part of or extends from front sloped surface 168f of actuator ring 168. Pawl release surface 223 contacts pawl 200 as handle actuator 180 pivots forward and down towards a water-off position, thereby causing pawl 200 to pivot upward and out of engagement with an actuator gear 216, which is preferably formed unitarily with upper end 165b of valve stem 165 but could be a separate component that is fixedly attached to upper end 165b.

Figure 22:
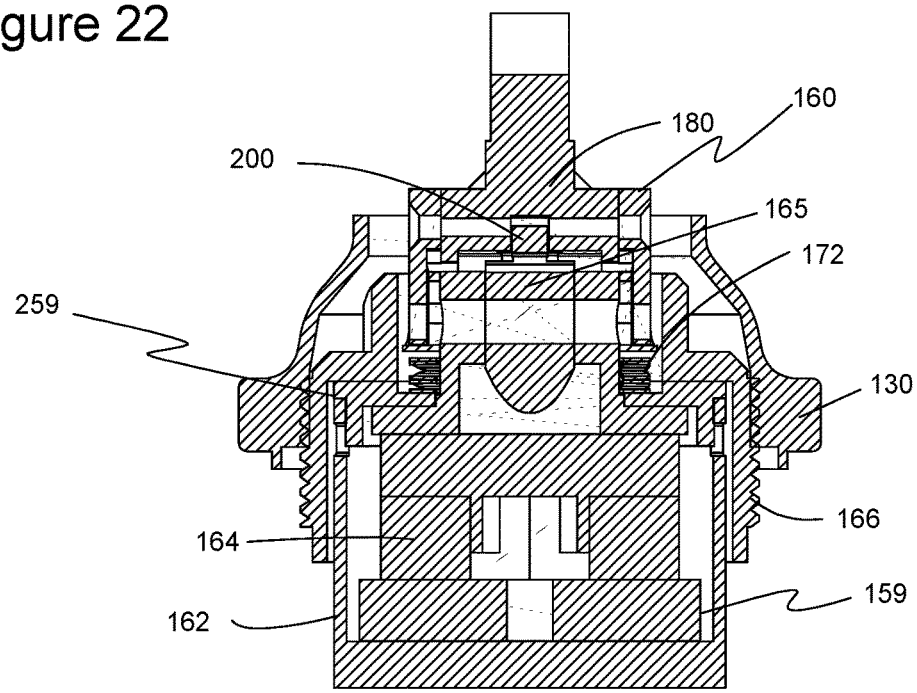
FIG. 22 is a front cross-sectional view of the valve cartridge of FIG. 17.
Figure 23:
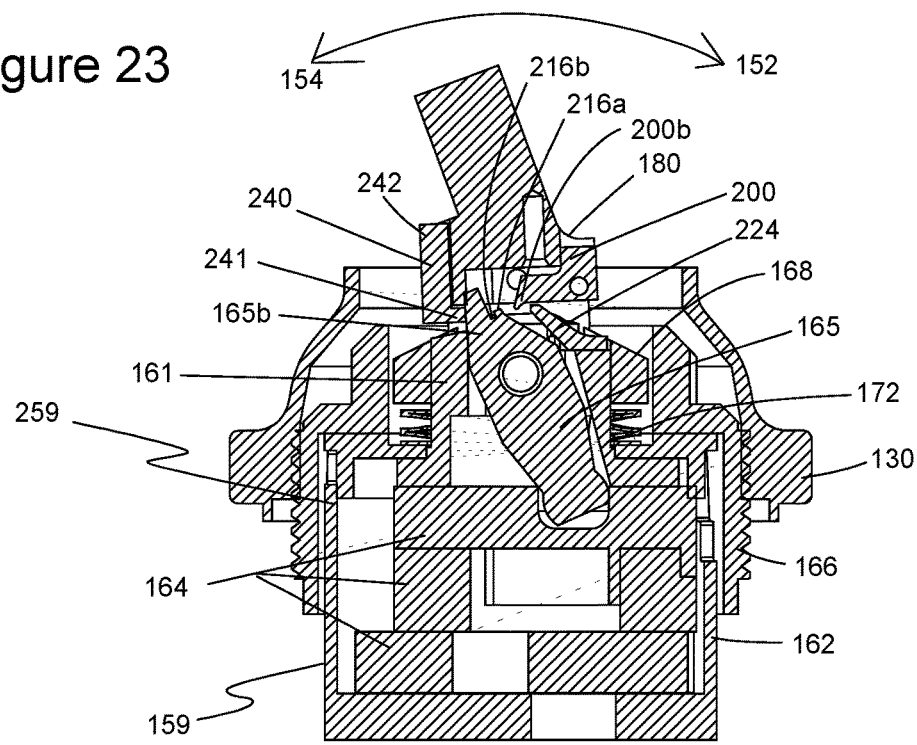
FIG. 23 is a side cross-sectional view of the valve cartridge of FIG. 17 showing the valve stem and regulator in a fully-open position and the handle actuator in the neutral position.

Referring now to FIGS. 22 and 23, front and side sectional views, respectively, illustrate one embodiment of valve cartridge 259 assembled with cartridge lock 166 and flow control cover 130, where valve stem 165 and regulator 164 are in the fully-open position. Valve assembly 159 of valve cartridge 259 includes a cylindrical valve body 162 that houses a conventional regulator 164, shown here as a disk regulator. Ball regulators 164 and other types of regulators 164 known in the art are acceptable. With lower end 165b of valve stem 165 engaging regulator 164, valve stem 165 extends up from regulator 164 through valve stem stop 161 and actuator ring 168.

Actuator gear 216 is attached to or formed in upper end 165b of valve stem 165 and has one or more teeth 216a and/or slots 216b. In this embodiment, actuator gear 216 has a single tooth 216a and a gear slot 216b between gear tooth 216a and an upper pawl engaging structure 216c against which pawl 200 contacts to push valve stem 165 to a water-on position. In the fully-open position as shown, for example, in FIG. 23, upper end 165b of valve stem 165 abuts valve closing member 240 and valve stem stop 161. Lower end 165d of valve stem 165 moves regulator 164 to the fully-open position. When handle actuator 180 is pivoted in a forward direction 152 (e.g., toward user) or backward direction 154 (e.g., away from user), biasing member 172 is at least partially compressed by actuator ring 168 and applies a force to bias actuator ring 168 to return to the neutral position as shown in FIGS. 22-23. Pivoting handle actuator 180 to a furthest forward position 152 causes pawl 200 to engage pawl-release member 224, thereby raising gear-engaging portion 200b (e.g., tip) and disengaging pawl 200 from actuator gear 216 on valve stem 165. At the same time, valve closing member 240 abuts upper end 165b of valve stem 165 and pivots valve stem 165 to a closed position, thereby closing regulator 164. One or more pawl biasing member 210 (shown, for example, in FIG. 6) are used to bias pawl 200 towards engagement with actuator gear 216 on valve stem 165. In one embodiment, pawl biasing member 210 is a torsion spring.

In one embodiment, valve closing member 240 is substantially L-shaped with a first closer portion 241 connecting to actuator body portion 186 and a second closer portion 242 extending downwardly towards actuating ring 168. In this embodiment, it is right and left rear protrusions 186c, 186d of handle actuator 180 that interacts and contacts contoured side portions 168e and, specifically, contoured rear portions 168e2 that restricts the throw of handle 140 in an upwards pivot of the handle towards an open position. When handle 140 is operated to the water-off position with a forward 152 and downwards pivot of handle 140, first closer portion 241 engages valve stem 165 to return it to its vertical or off position. In other embodiments, valve closing member 240 is a catch or protrusion extending from handle actuator 180 or other component that engages and closes valve stem 165 when handle 140 is moved to the water-off position. Valve closing member 240 acts in conjunction with valve stem stop 161 as a stop when handle 140 is operated to the full water-on position; valve closing member 240 acts to close valve stem 165 when handle 140 is operated to the water-off position.

As noted above, cam mechanism 189, which includes pawl 200, pawl-release member 204, and actuator gear 216, can be a mechanical, electro-mechanical, or electrical mechanism that is used to incrementally adjust the position of valve stem 165, and therefore the flow of water through valve cartridge 159.

Referring to FIGS. 24 and 24A, a side view shows flow control assembly 160 assembled to valve assembly 159 forming valve cartridge 259 with handle actuator 180 in a neutral handle position with water flow off as indicated by valve stem 165 being in a vertical or water-off position and regulator 164 positioned against the rearward wall 154 of valve body 162. FIG. 24A is a cross-sectional view of handle actuator 180 showing the actuator front and rear protrusions 186a, 186c and their position on contoured side portions 168e of top surface 168 of actuator ring 168. It is understood that biasing member 172 contacts both actuator ring 168 and valve stem stop 161 and exerts a biasing force against the bottom of actuator ring 168 in order to impart the "on-center" feel at the neutral position, as explained previously, and, further, that the separation between an upper surface of biasing member 172 and a bottom surface of actuator ring 168 is provided only for clarity purposes.

Referring now to FIGS. 25 and 25A, a side view shows flow control assembly 160 and valve assembly 159 of valve cartridge 259 with handle actuator 180 moved to a first water-flow on position showing pawl 200 in contact with upper end 165b of valve stem 165 having pushed valve stem 165 into the first position. FIG. 25A is a cross-sectional view of handle actuator 180 showing the actuator front and rear protrusions 186a, 186c on the contoured side portion 168e before release of handle 140. What is not shown but actually occurs is that protrusion 186c also pushes down on actuator ring 168 at least partially compressing biasing member 172 at least on that side when handle 140 is lifted to the on position.

FIGS. 26 and 26A show the position of handle actuator 180 after release of the handle 140 where handle 140 has returned to a neutral handle position and regulator 164 open as indicated by valve stem 165 being slightly tilted with regulator 164 moved to an open position between opposite walls of valve body 162. To achieve this position of flow control assembly 160, handle 140 (shown in FIGS. 1-2) has been pushed to the rearward position 154 to pivot handle 140, actuator member 180, actuator ring 168, and valve stem 165. Although not shown, this pivotal action causes valve ring 168 to compress biasing member 172 and move valve stem 165 to an open position to allow water to flow at a rate R1 proportional to this valve opening. In one embodiment, rate R1 is the lowest rate of flow and is ideal for activities such as brushing one's teeth. After releasing handle 140, biasing member 172 then returns actuator member 180 and actuator ring 168 to the neutral position as shown in FIGS. 26 and 26A while leaving valve stem 165 in the open position. Pawl 200 is now positioned forward of tooth 216*a* of actuator gear 216. Moving handle 140 downward from the position shown in FIG. 26 would cause valve closing member 240 to move valve stem 165 to the water-off (closed) position; moving handle 140 rearward 154 from the position shown in FIG. 26 would cause pawl 200 to engage tooth 216*a* to move valve stem 165 to the fully-open or more-open position.

Referring to FIGS. 27 and 27A, a side view shows flow control assembly 160 and valve assembly 159 of valve cartridge 259 with handle actuator 180 moved to a second water-flow on position (in this case, a full open water-on position) showing pawl 200 in contact with tooth 216*a* of upper end 165*b* of valve stem 165 having pushed valve stem 165 into the full on position to abut valve stem stop 161. FIG. 27A is a cross-sectional view of handle actuator 180 showing the actuator front and rear protrusions 186*a*, 186*c* on the contoured top side portion 168*e* before release of handle 140. FIGS. 28 and 28A show the position of handle actuator 180 after release of the handle 140 where handle 140 has returned to a neutral handle position and valve assembly 159 in the fully-open position as indicated by valve stem 165 being rotated to abut valve stem stop 161 with regulator 164 moved to the fully-open position against the forward wall of valve body 162. Pawl does not engage valve stem 165 after having returned to the neutral position; however, valve closing member 240 is positioned to return valve stem 165 to either the water-off or closed position shown in FIG. 24 or an intermediate water-on/flow position.

Referring to FIGS. 29 and 29A, flow control assembly 160 is in the forward position 152 (See FIG. 23 as reference) with valve closing member 240 moving valve stem 165 to the water-off or closed position. Simultaneously with this movement to the water-off or closed position, pawl 200 is pushed upward by pawl release cam member 224. As previously discussed, what is not shown but actually occurs is that protrusion 186*a* also pushes down on actuator ring 168 at least partially compressing biasing member 172 at least on that side when handle 140 is pushed to the off position. From this position, releasing handle 140 causes biasing member 172 to returned handle 140 to the neutral handle position. Because pawl release cam member 224 has pushed pawl 200 upward, pawl 200 is now in position to re-engage with slot 216*b* of actuator gear 216. When the handle is released and as it returns to the neutral position, pawl 200 slides across the top of tooth 216*a* to engage slot 216*b* of actuator gear 216 caused by a biasing action against pawl 200 by a pawl biasing spring that forces pawl 200 into slot 216*b* as shown in FIG. 24 in preparation for the next index move, if any, of handle 140 when pushed upward to the water-on position. In this embodiment, a coil spring (not shown) may be disposed within a spring recess 180*b* with one end of the coil spring against a top surface of pawl 200. As discussed above, at any point during operation of single lever faucet 100, pushing handle 140 down or forward 152 will cause valve closing member 240 to engage and pivot valve stem 165 to the vertical or water-off position, thereby causing the flow to stop completely.

It is contemplated that single lever faucet 100 is not limited to any particular number of indexed levels of flow. Embodiments of single lever faucet 100 can accommodate more or fewer indexed flow steps as desired. It should also be noted that with proper ratchet assembly design, the incremental flow rates can increase by different amounts from one flow rate to the next. Accordingly, water flow increases need not be linear increments. For example, the slots 216*b* and teeth 216*a* could be spaced such that the first open position allows two gallons per minute (GPM) to flow, the second open position allows eight GPM and the third open position allows 15 GPM and so on. Conversely, with a linear flow rate increase, slots 216*b* and teeth 216*a* would be evenly spaced and the flow rate increase for each operation of handle 140 upward to the open position would be the same increase in flow rate. Therefore, linear flow rate increases could provide flow rates R1, R2, and R3 of five, ten, and fifteen GPM, respectively.

Although various embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A valve cartridge for placement within a single-lever faucet comprising: a valve assembly constructed to be disposed in a manifold of a faucet body, the valve assembly comprising: a valve body; a regulator having a valve stem stop with a top surface and defining an opening axially through the valve stem stop from the top surface, the regulator having a pawl release member disposed on the top surface of the valve stem stop and extending toward and into the opening of the valve stem stop and upwardly from the valve stem stop; and a valve stem having a lower end portion and an upper end portion, the valve stem pivotally disposed in the opening of the valve stem stop wherein the valve stem lower end portion operatively engages the regulator, and the upper end portion has an actuator gear disposed thereon, wherein the valve stem is operable between a closed valve position and a plurality of open valve positions, wherein the valve assembly is configured to control a flow rate of water; and a flow control assembly operatively connected to the valve assembly and attached to a handle of the single-lever faucet, the flow control assembly comprising: a handle actuator having an actuator element adapted to attach to the handle of the single-lever faucet, the handle actuator pivotably connected to the valve assembly, wherein the handle actuator is operable between a water-on position, a neutral position and a water-off position, and wherein the handle actuator operates the valve stem to control the flow rate of the water; a pawl pivotably connected to the handle actuator and positioned to engage the actuator gear on the valve stem when the handle actuator is pivoted to the water-on position and to engage the pawl release member on the valve stop body of the valve assembly when the handle actuator is pivoted to the water-off position; an actuator ring having at least a top surface that interacts with a bottom portion of the handle actuator; and a biasing member disposed between the valve assembly and the handle actuator providing a vertical motion to the handle actuator and wherein the biasing member provides a resilient force to bias the handle actuator towards the neutral position when the handle actuator is pivoted to the water-on position or to the water-off position; wherein the handle actuator automatically returns to the neutral position with the water flowing after the user pivots the handle actuator to the water-on position followed by the user releasing the handle actuator; and wherein the handle actuator automatically returns to the neutral position with no water flowing after the user pivots the handle actuator to the water-off position followed by the user releasing the handle actuator.

2. The single-lever faucet valve assembly of claim 1, wherein pivoting the handle actuator a first time to the water-on position moves the valve stem to a first open valve position with a first water flow rate and subsequently pivoting the handle actuator a second time to the water-on position moves the valve stem to a second open valve position with a second flow rate greater than the first flow rate.

3. The single-lever faucet valve assembly of claim 2, wherein, when the valve stem is in the closed valve position, pivoting the handle actuator to the water-on position causes the pawl to engage the actuator gear and move the valve stem to the first open valve position.

4. The single-lever faucet valve assembly of claim 3, wherein when the valve stem is in the first open valve position, pivoting the handle actuator from the neutral position to the water-on position causes the pawl to engage the actuator gear and move the valve stem to the second open valve position.

5. The single-lever faucet valve assembly of claim 1 wherein the actuator ring defines an actuator ring opening, wherein the actuator ring is on an upper portion of the valve stem stop with the upper portion of the valve stem stop extending into the actuator ring opening, the handle actuator pivotably connected to the actuator ring, and with the biasing member positioned between the actuator ring and a valve body upper surface.

6. The single-lever faucet valve assembly of claim 5, wherein the biasing member is a helical wave spring and wherein pivoting an actuator member to the water-on position or to the water-off position causes the actuator ring to compress the helical wave spring, thereby biasing the handle actuator to return to the neutral position.

7. The single-lever faucet valve assembly of claim 6, wherein the top surface of the actuator ring defines a pair of contoured top side portions positioned on opposite sides of the actuator ring opening, each of the pair of contoured top side portions having a middle contoured portion and front and rear contoured portions sloping down and away from the middle contoured portion,
wherein the handle actuator defines a plurality of protrusions extending down towards the actuator ring, and
wherein each of the pair of contoured top side portions is shaped to accommodate an arc of rotation of the handle actuator and shaped to engage at least one of the plurality of protrusions in each of the neutral position, the water-on position and the water-off position, thereby raising the handle actuator along the central vertical axis with respect to the actuator ring when the handle actuator is in the neutral position.

8. The single-lever faucet valve assembly of claim 7, wherein the contoured top side portions and the plurality of protrusions interact in combination to make the biasing member compress non-linearly over a resultant vertical motion of the biasing member thereby providing more force to the neutral position of the handle.

9. The single-lever faucet valve assembly of claim 1, wherein pivoting the handle actuator to the water-off position when the valve stem is in any of the plurality of open valve positions moves the valve stem to the closed valve position.

10. The single-lever faucet valve assembly of claim 1, wherein the actuator gear is on the upper end portion of the valve stem and has a plurality of gear teeth with a gear slot between adjacent ones of the plurality of gear teeth.

11. The single-lever faucet valve assembly of claim 1 further comprising a valve-closing member on the handle actuator, wherein the valve-closing member engages the valve stem and moves the valve stem to the closed valve position when the handle actuator is moved to the water-off position.

12. A water flow control assembly for a single lever faucet, the assembly comprising:
a faucet-valve coupler constructed to operatively connect a handle of a single lever faucet to a valve stem of a valve assembly of the single lever faucet and to engage the valve assembly of the single lever faucet, wherein the faucet-valve coupler has a handle actuator pivotably connected to an actuator ring defining an actuator ring opening, wherein the actuator ring is disposed on the valve assembly with the valve stem extending through the actuator ring opening, and wherein the handle actuator is operable between a water-on position, a neutral position, and a water-off position;
a ratchet assembly having a valve stem portion and a handle portion, the ratchet assembly being operatively connected to the valve stem of the valve assembly, wherein the handle portion engages the valve stem portion to increment the valve stem to a plurality of predefined open valve positions in response to each pivot of the handle actuator to the water-on position, and wherein the handle portion disengages from the valve stem portion in response to pivoting the handle actuator to the water-off position; and
a biasing member disposed between the actuator ring and the valve assembly of the single lever faucet providing a vertical motion to the handle actuator, wherein the biasing member automatically returns the handle actuator to the neutral position when the user pivots the handle actuator to the water-on position or the water-off position followed by the user releasing the handle actuator.

13. The assembly of claim 12, wherein the valve stem portion of the ratchet assembly includes a gear actuator on an upper end portion of the valve stem, and wherein the handle portion includes a pawl pivotably attached to the handle actuator and a pawl release attached to the valve assembly, wherein moving the faucet-valve coupler to the water-on position causes the pawl to engage the gear actuator and move the valve stem to one of the plurality of predefined open valve positions, and wherein moving the faucet-valve coupler to the water-off position moves the valve stem to a closed valve position and causes the pawl to engage the pawl release and disengage the pawl from the gear actuator.

14. The assembly of claim 13, wherein the gear actuator has a plurality of gear slots, and wherein each movement of the faucet-valve coupler from the neutral position to the water-on position increments the valve stem to one of the plurality of predefined open valve positions with an increased water flow rate.

15. The assembly of claim 12, wherein a top surface of the actuator ring defines a pair of contoured top side portions positioned on opposite sides of the actuator ring opening, each of the pair of contoured top side portions having a middle contoured portion and front and rear contoured portions sloping down and away from the middle contoured portion, wherein the handle actuator defines a plurality of protrusions extending down towards the actuator ring, and wherein each of the pair of contoured top side portions is shaped to accommodate an arc of rotation of the handle actuator and shaped to engage at least one of the plurality of protrusions in each of the neutral position, water-on position and the water-off position, thereby raising the handle actuator along a central vertical axis with respect to the actuator ring when the handle actuator is in the neutral position.

16. The single-lever faucet valve assembly of claim 15, wherein the contoured top side portions and the plurality of protrusions interact in combination to make the biasing member compress non-linearly over a resultant vertical motion of the biasing member thereby providing more force to the neutral position of the handle.

17. The assembly of claim 12 further comprising a valve-closing member on the faucet-valve coupler, wherein moving the faucet-valve coupler to the water-off position causes the valve-closing member to engage and move the valve stem to a closed valve position.

* * * * *